United States Patent
Suzuki et al.

(10) Patent No.: US 7,992,027 B2
(45) Date of Patent: Aug. 2, 2011

(54) POWER SUPPLY DEVICE AND STORAGE CONTROL DEVICE

(75) Inventors: Hiroshi Suzuki, Sagamihara (JP);
Tetsuya Inoue, Odawara (JP); Masahiro Sone, Numazu (JP); Toshiyuki Nagamori, Odawara (JP); Masateru Kurokawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 878 days.

(21) Appl. No.: 12/007,103

(22) Filed: Jan. 7, 2008

(65) Prior Publication Data
US 2008/0191552 A1   Aug. 14, 2008

(30) Foreign Application Priority Data
Feb. 8, 2007   (JP) .................................. 2007-028778

(51) Int. Cl.
*G06F 1/00* (2006.01)

(52) U.S. Cl. ........................... 713/330; 713/300; 307/29

(58) Field of Classification Search .................... 307/11, 307/18, 29; 714/1; 713/300, 330, 340
See application file for complete search history.

(56) References Cited

U.S. PATENT DOCUMENTS

| | | | |
|---|---|---|---|
| 7,051,216 B2 | 5/2006 | Suzuki et al. | |
| 7,365,516 B2 * | 4/2008 | Leyten et al. | 320/116 |
| 7,557,461 B2 * | 7/2009 | Kawakubo et al. | 307/29 |
| 2010/0033020 A1 * | 2/2010 | Suzuki et al. | 307/82 |

FOREIGN PATENT DOCUMENTS

| JP | 11-168832 | 12/1997 |
|---|---|---|
| JP | 2004-126972 | 10/2002 |

OTHER PUBLICATIONS

David A. Patterson et al., "A Case for Redundant Arrays of Inexpensive Disks (RAID)", 1988 ACM, pp. 109-116.

* cited by examiner

*Primary Examiner* — Clifford H Knoll
(74) *Attorney, Agent, or Firm* — Foley & Lardner LLP

(57) ABSTRACT

The power supply device of the present invention supplies power individually to a plurality of disk drives by rendering a plurality of DC/DC converters redundant. One redundant power supply substrate is assigned to a plurality of normal power supply substrates. One redundant power supply substrate supports the outputs of a plurality of normal power supply substrates. The main DC/DC converters in the normal power supply substrate correspond with the subgroups on a one-for-one basis. The secondary DC/DC converters in the redundant power supply substrate each correspond with all of the respective subgroups and are able to supply power to a predetermined single disk drive among the respective disk drives in the subgroups for each of the subgroups.

12 Claims, 23 Drawing Sheets

FIG. 10

DRIVE MANAGEMENT TABLE T1

| DRIVE GROUP# I11 | SUBGROUP# I12 | DRIVE# I13 |
|---|---|---|
| DG01 | SG1 | 0 |
| | | 1 |
| | | 2 |
| | SG2 | 3 |
| | | 4 |
| | | 5 |
| | SG3 | 6 |
| | | 7 |
| DG02 | SG2-1 | 8 |
| | | 9 |
| | | A |
| | SG2-2 | B |
| | | C |
| | | D |
| | SG2-3 | E |
| | | F |
| . . . | | |

| MAIN DC/DC CONVERTER MANAGEMENT TABLE ||| 
|---|---|---|
| I21 | I22 | I23 |
| DC/DC# | TERMINAL# | DRIVE# |
| A1-1 | 0 | 0 |
| | 1 | 1 |
| | 2 | 2 |
| A1-2 | 0 | 3 |
| | 1 | 4 |
| | 2 | 5 |
| A1-3 | 0 | 6 |
| | 1 | 7 |
| A2-1 | 0 | 8 |
| | 1 | 9 |
| | 2 | A |
| A2-2 | 0 | B |
| | 1 | C |
| | 2 | D |
| A2-3 | 0 | E |
| | 1 | F |
| ... |||

FIG. 12

SECONDARY DC/DC CONVERTER MANAGEMENT TABLE (T3)

| DC/DC# (I31) | TERMINAL# (I32) | RELAY SUBSTRATE# (I33) | DRIVE# (I34) |
|---|---|---|---|
| AN1 | 0, 1, 2 | 2 | 0 |
| | | | 3 |
| | | | 6 |
| | | 1 | 8 |
| | | | B |
| | | | E |
| AN2 | 0, 1, 2 | 2 | 1 |
| | | | 4 |
| | | | 6 |
| | | 1 | 9 |
| | | | C |
| | | | F |
| AN3 | 0, 1 | 2 | 2 |
| | | | 7 |
| | | 1 | A |
| | | | D |
| . . . | | | |

POWER SUPPLY DEVICE AND STORAGE CONTROL DEVICE

CROSS-REFERENCE TO RELATED APPLICATIONS

This application relates to and claims priority from Japanese Patent Application No. 2007-28778 filed on Feb. 8, 2007, the entire disclosure of which is incorporated herein by reference.

BACKGROUND OF THE INVENTION

1. Field of the Invention

The present invention relates to a power supply device and a storage control device.

2. Description of the Related Art

The storage control device comprises a storage section in which a multiplicity of hard disk drives are connected in the form of an array and provides a host computer ('host' hereinbelow) such as a server with logical storage regions (logical volumes).

In order to increase reliability and highly availability, the storage control device provides the host with storage regions that are redundant based on RAID (Redundant Array of Independent Disks). Further, the storage control device affords the various resources such as the microprocessor and communication path redundancy. From the perspective of such high reliability and high availability, the power supply device of the storage control device is also made redundant.

Therefore, according to a first conventional technology, a DC/DC converter is installed in each of the hard disk drives (Japanese Application Laid Open No. 2004-126972). As a result, according to the first technology, even when power fault occurs within any one hard disk drive, the power fault prevents an adverse effect on the other hard disk drives.

According to a second conventional technology, a plurality of hard disk drives are constituted as one group and a plurality of DC/DC converters are assigned to each group (Japanese Application Laid Open No. H11-168832). According to the second conventional technology, power is normally supplied to the respective hard disk drives by one DC/DC converter. According to the second conventional technology, when a fault occurs in one DC/DC converter, there is an automatic switch from one DC/DC converter to another DC/DC converter and power is supplied by the other DC/DC converter to the respective hard disk drives.

According to the first conventional technology of Japanese Application Laid Open No. 2004-126972, because a DC/DC converter is installed in each hard disk drive, each DC/DC converter must be able to output balanced power at the level of the maximum power consumed by the respective hard disk drives. Hence, DC/DC converters with an adequate output performance must be prepared in a number equal to the total number of hard disk drives and the costs of power supply devices increase. Furthermore, because there is a need to prepare DC/DC converters of the same number as that of hard disk drives, there is an increase in the number of parts and the stockpile number, whereby the productivity of the power supply device is reduced.

According to the first conventional technology, because the output capacities of the respective DC/DC converters are established in accordance with the maximum power consumption of the respective hard disk drives, the output capacity of an AC/DC converter for supplying DC power to the respective DC/DC converters must be large. As a result, the costs of the power supply device increase and the device size also increases.

Furthermore, according to the first conventional technology, because the respective hard disk drives individually contain a DC/DC converter, when a power fault occurs in the DC/DC converter, the respective hard disk drives cannot be operated.

In addition, according to the first conventional technology, each of the hard disk drives comprises only one DC/DC converter and the DC/DC converters do not have a redundant configuration. Hence, the DC/DC converter alone cannot be exchanged.

Furthermore, with the first conventional technology, when power fault has occurred, it is not possible to specify whether a fault of the DC/DC converter is the cause or whether the occurrence of a fault in another circuit in the hard disk drive is the cause of the power fault. Therefore, for the hard disk drive in which the power fault occurred, the whole of the hard disk drive must be exchanged.

According to the second conventional technology, because a plurality of DC/DC converters are provided in group units, it is possible to reduce the number of DC/DC converters in comparison with the first conventional technology. However, with the second conventional technology, because it is necessary to prepare a first DC/DC converter and a second DC/DC converter for each group, the costs of the power supply device increase. According to the second conventional technology, normally power is supplied by only the first DC/DC converter to each of the hard disk drives while the second DC/DC converter remains on standby. Hence, according to the second conventional technology, there is a large number of DC/DC converters that are normally not used and the costs increase. Further, because the space of the storage control device is then small to the extent that a DC/DC converter that is not normally used is installed, it is hard to install a multiplicity of hard disk drives in the storage control device.

SUMMARY OF THE INVENTION

The present invention was conceived in view of the above problem and an object thereof is to provide a power supply device constituted to be able to efficiently supply DC power to a storage device and raise the fault tolerance as well as a method of supplying the power supply of the power supply device. A further object of the present invention is to provide a power supply device constituted to be able to individually control whether DC power is supplied to each storage device as well as a method of supplying the power supply of the power supply device. Further objects of the present invention will become clear from the subsequent description of the embodiments.

In order to solve the above problem, the power supply device that supplies power to a load in accordance with a first aspect of the present invention comprises a plurality of first power supply units which are provided in correspondence with a plurality of load groups each constituted comprising a plurality of loads and which each supply power via a first path to the respective loads in the corresponding load groups; a second power supply unit that is provided in correspondence with all of the load groups and which supplies power via a second path to the respective loads in the respective load groups; and a power supply control section that controls the first power supply units and the second power supply unit, respectively, wherein the respective first power supply units each comprise first power supply output sections of the same number as that of a plurality of subgroups that are provided in the respective load groups; the second power supply unit comprises second power supply output sections of the same number as that of the subgroups; the respective first power supply output sections correspond with the respective subgroups in the corresponding load groups and supply power via the first path to each of the loads in the corresponding subgroups; and the respective second power supply output sections correspond with all of the respective subgroups in the respective load groups and supply power via the second path to any one predetermined load among the respective loads in the subgroups for each of the subgroups.

According to the embodiment of the present invention, the respective first power supply units are each provided with a relay section for outputting power that is input from the second power supply unit to the other first power supply units; and one end of the second path is connected midway along the predetermined first path which is connected to the predetermined load and the other end of the second path is connected to the second power supply unit via the relay section of the first power supply unit other than the first power supply unit to which the predetermined first path is connected.

According to the embodiment of the present invention, the respective first power supply units are each provided with a relay section for outputting power that is input from the second power supply unit; one pair is constituted by two of the first power supply units; the relay section in the first of the first power supply units constituting the pair is connected to the first path that is connected to the second of the first power supply units constituting the pair; and the relay section in the second of the first power supply units is connected to the first path that is connected to the first of the first power supply units.

According to the embodiment of the present invention, the respective second power supply output sections are set to output power of a lower voltage value than a voltage value of the power supply that is output from each of the first power supply output sections.

According to the embodiment of the present invention, the first and second paths are each provided with backflow prevention elements that allow an electric current to flow toward the load but prevent an electric current from flowing in the reverse direction; and the power supply device is configured so that the number of the backflow prevention elements on the second path is larger than the number of the backflow prevention elements on the first path.

According to the embodiment of the present invention, the respective first power supply units and the second power supply unit each comprise a voltage conversion section for reducing the voltage value of the input power supply and outputting the reduced voltage value; in the respective first power supply units, the respective first power supply output sections convert the power supply that is input from the voltage conversion section in the first power supply unit into a power supply of a first predetermined voltage and outputs the converted power supply to the first path; and in the second power supply unit, the respective second power supply output sections convert the power supply that is input from the voltage conversion section in the second power supply unit into a power supply of a second predetermined voltage that is lower than the first predetermined voltage and outputs the converted power supply to the second path.

According to the embodiment of the present invention, the power supply control section individually controls the supply of power and stoppage of the power supply for each of the loads by controlling a power supply operation of a predetermined first power supply output section and a predetermined second power supply output section which are connected to a predetermined load respectively, among the respective first power supply output sections and the respective second power supply output sections.

According to the embodiment of the present invention, the power supply control section stops the supply of power to the predetermined load by stopping the power supply of the predetermined first power supply output section and the predetermined second power supply output section, and reports the fact that the supply of power to the predetermined load has stopped; and the power supply control section supplies power to the predetermined load by starting the power supply of the predetermined first power supply output section and the predetermined second power supply output section, and reports the fact that the power supply to the predetermined load has started.

According to the embodiment of the present invention, the power supply control section causes the respective power supply output sections to operate after starting the supply of power from the first power supply output section to the respective loads.

According to the embodiment of the present invention, the power supply control section: (1) acquires each of the states of the respective first power supply output sections and the respective second power supply output sections; (2) in cases where a fault is detected in only either the respective first power supply output sections or the respective second power supply output sections, outputs a warning with respect to the power supply output section in which the fault has been detected; (3) in cases where a fault is detected in the first power supply output section and the second power supply output section that supply power to the same load, among the respective first power supply output sections and the respective second power supply output sections, acquires the state of the load connected to the first power supply output section and the second power supply output section in which the fault has been detected, and judges whether a fault has occurred in the load on the basis of the acquired state; (4) in cases where it is judged that a fault has occurred in the load, outputs a warning with respect to the load; and (5) in cases where it is judged that a fault has not occurred in the load, outputs a warning with respect to the first power supply output section and the second power supply output section in each of which the fault has been detected.

According to another aspect of the present invention, the load is a storage device that is used in the storage control device.

A storage control device that provides a higher-level device with a storage region according to another aspect of the present invention, comprising: a plurality of storage devices that consume electric power; a controller that controls the operation of the respective storage devices; a power supply device that supplies power to the respective storage devices; a plurality of device groups each constituted comprising a plurality of the storage devices; and a plurality of subgroups which are provided in the respective device groups and which are each constituted comprising a plurality of the storage devices, wherein the power supply device comprises: a plurality of first power supply units provided in correspondence with the respective device groups and which each supply power via a first path to the respective storage devices in the corresponding device groups; a second power supply unit that is provided in correspondence with all of the device groups and which supplies power via a second path to the respective storage devices in the respective device groups; and a power supply control section that controls the first power supply units and the second power supply unit, respectively, wherein the respective first power supply units each comprise first power supply output sections of the same number as that of the subgroups; the second power supply unit comprises second power supply output sections of the same number as that of the subgroups; the respective first power supply output sections correspond with the respective subgroups in the corresponding device groups and supply power via the first path to each of the storage devices in the corresponding subgroups; and the respective second power supply output sections correspond with all of the respective subgroups in the respective device groups and supply power via the second path to any one predetermined storage device among the respective storage devices in the subgroups for each of the subgroups.

BRIEF DESCRIPTION OF THE DRAWINGS

FIG. 10 is an explanatory diagram showing the constitution of a table for managing the disk drives;

FIG. 11 is an explanatory diagram showing the constitution of a table for managing the main DC/DC converters in the normal power supply substrate;

FIG. 12 is an explanatory diagram showing the constitution of a table for managing secondary DC/DC converters in the redundant power supply substrate;

DESCRIPTION OF THE SPECIFIC EMBODIMENTS

Figure 1:
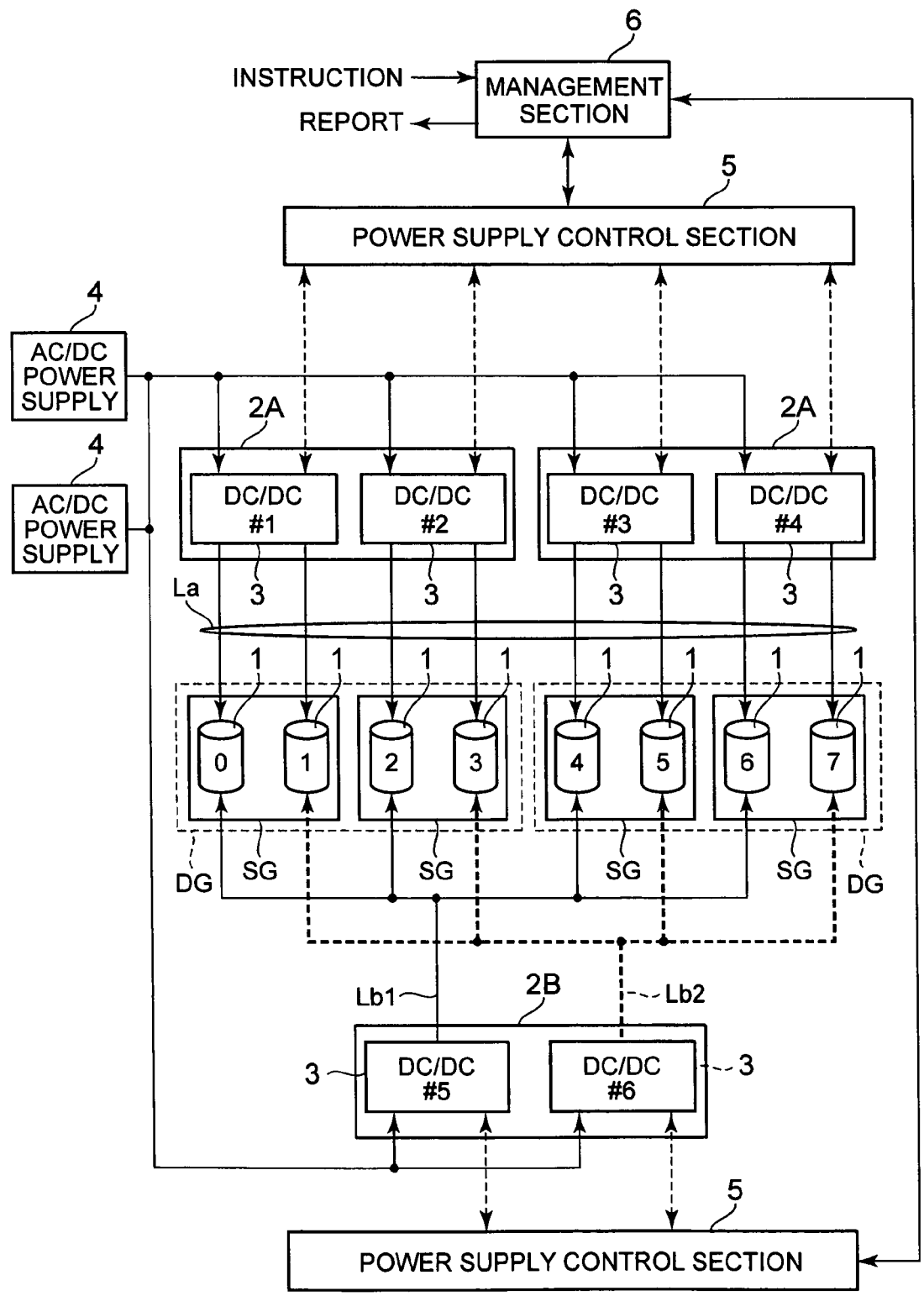
FIG. 1 is an explanatory diagram illustrating the concepts of an embodiment of the present invention.

Embodiments of the present invention will be described hereinbelow on the basis of the drawings. These embodiments will be described by taking a power supply device of the storage control device by way of example. FIG. 1 is an explanatory diagram of the overall concept of the power supply device of the embodiments.

The storage control device comprises a plurality of disk drives 1. The disk drives 1 correspond to 'loads' or 'storage devices'. Possible storage devices include, for example, hard disk drives, semiconductor memory devices, flash memory devices, optical disk drives, magneto-optical disk drives, and magnetic tape devices.

One drive group DG is constituted by a plurality of disk drives 1. A drive group DG is a group of a plurality of disk drives 1 provided in the same enclosure, for example, and power is supplied to each drive group.

A drive group DG corresponds to a 'load group' or 'disk group' and differs from a parity group which is a logical group. One drive group DG is divided into a plurality of subgroups SG. That is, each drive group DG comprises a plurality of subgroups SG. In this embodiment, the number of subgroups SG that each drive group DG comprises is the same.

In FIG. 1, the subgroups SG are established so that the number of disk drives 1 belonging to the respective subgroups SG is the same. However, as will become clear from the subsequent embodiments, the number of disk drives 1 constituting each subgroup SG need not necessarily be the same number.

In the example shown in FIG. 1, the respective subgroups SG are each constituted by two disk drives 1. Further, each disk group DG comprises two subgroups SG.

In other words, in the example shown in FIG. 1, one drive group DG is constituted by a total of four disk drives 1, namely, #0 to #3. Likewise, another drive group DG is constituted by a total of four disk drives 1, namely, #4 to #7. Further, one subgroup SG is constituted by two disk drives 1 in each drive group DG. The constitution shown in FIG. 1 is simplified for the sake of comprehension of the present invention and the present invention is not limited to the constitution shown in FIG. 1.

The power supply device can be constituted comprising, for example, a plurality of normal power supply substrates 2A, at least one redundant power supply substrate 2B, and at least one power supply control section 5. The power supply device supplies power such as DC 5V or DC 12V, for example, to each disk drive 1. The power supply device is also able to supply power to other parts of the storage control device. Other parts can include, for example, a controller for controlling the overall operation of the storage control device, and a cooling fan and so forth, for example. The constitution of the storage control device will be made clear in the following embodiments.

The normal power supply substrates 2A correspond to the 'first power supply units'. The redundant power supply substrate 2B corresponds to the 'second power supply unit' The normal power supply substrates 2A and redundant power supply substrate 2B are each provided outside the disk drives 1.

The respective normal power supply substrates 2A and one redundant power supply substrate 2B can be constituted as power supply substrates with the same constitution. By affording the normal power supply substrates 2A and the redundant power supply substrate 2B the same constitution, the fabrication costs and management costs of the power supply substrate can be reduced. As will become clear from the subsequent embodiments, the output voltage value of the normal power supply substrates 2A and the output voltage value of the redundant power supply substrate 2B can be set with different values.

As shown in FIG. 1, one pair is constituted by two normal power supply substrates 2A and one redundant power supply substrate 2B. This pair is a management unit for supplying power to the respective disk drives 1. The storage control device can comprise a plurality of such pairs. Hence, as will be described in subsequent embodiments, the storage control device is provided with a plurality of normal power supply substrates 2A and a plurality of redundant power supply substrates 2B. In other words, in one power supply unit, one redundant power supply substrate 2B is made to correspond with a plurality of normal power supply substrates 2A. That is, one redundant power supply substrate 2B supports a plurality of normal power supply substrates 2A.

The normal power supply substrates 2A are provided in correspondence with the respective drive groups DG. One normal power supply substrate 2A is made to correspond with each drive group DG. The redundant power supply substrate 2B is made to correspond with all the drive groups DG in one management unit.

The respective normal power supply substrates 2A supply predetermined power to each disk drive 1 in the corresponding drive group DG via a first path La. The redundant power supply substrate 2B supplies power to each of the disk drives 1 in all of the drive groups DG via a second path Lb (called 'the second path Lb' when Lb1 and Lb2 shown in FIG. 1 are combined).

However, as will become clear from the subsequent embodiments, normally, predetermined power is supplied only by the normal power supply substrates 2A to the respective disk drives 1 and power is not supplied by the redundant power supply substrate 2B to the respective disk drives 1. In cases where a power fault occurs, power is supplied by the redundant power supply substrate 2B.

The respective power supply substrates 2A and 2B each comprise a plurality of DC/DC converters 3. The respective DC/DC converters 3 convert DC power that is input by AC/DC power supply sections 4 into DC power of another voltage value (DC 5V, for example) and supply the resulting DC power to the corresponding disk drives 1.

The DC/DC converter 3 of the normal power supply substrates 2A corresponds to 'the first power supply output section'. The DC/DC converter 3 that the redundant power supply substrate 2B comprises corresponds to the 'second power supply output section'. In the example shown in FIG. 1, the respective power supply substrates 2A and 2B each comprise a DC/DC converter 3 of the same number as that of subgroups SG contained in one drive group DG. In the illustrated example, the number of subgroups SG is two and, therefore, the respective power supply substrates 2A and 2B each comprise two DC/DC converters 3.

The respective DC/DC converters 3 in the normal power supply substrates 2A correspond with the respective subgroups SG in the corresponding drive groups DG and power is supplied via the first path La to the respective disk drives 1 in the corresponding subgroups SG.

For example, the DC/DC converter 3 (#1) supplies power to the disk drive 1 (#0, #1) in the corresponding subgroup SG and the DC/DC converter 3 (#2) supplies power to the disk drives 1 (#2, #3) in the corresponding subgroup SG. Likewise, the DC/DC converter 3 (#3) supplies power to the disk drives 1 (#4, #5) in the corresponding subgroup SG and the DC/DC converter 3 (#4) supplies power to the disk drives 1 (#6, #7) in the corresponding subgroup SG. That is, the respective DC/DC converters 3 in the normal power supply substrates 2A correspond one-for-one with the respective subgroups SG in the corresponding drive groups DG of the normal power supply substrates 2A.

The respective DC/DC converters 3 in the redundant power supply substrate 2B are associated with all of the respective subgroups SG and are capable of supplying power to one predetermined disk drive 1 among the respective disk drives 1 in the respective subgroups SG for each of the subgroups SG.

For example, one DC/DC converter 3 (#5) in the redundant power supply substrate 2B is associated with the respective subgroups SG in the respective drive groups DG. Likewise, the other DC/DC converter 3 (#6) in the redundant power supply substrate 2B is associated with each of the subgroups SG in the respective drive groups DG.

The respective DC/DC converters 3 in the redundant power supply substrate 2B supply DC power to either one of the disk drives 1 among the respective disk drives 1 in the respective subgroups SG. That is, a first DC/DC converter 3 (#5) is connected to the respective disk drives 1 (#0, #2, #4, #6) via a path Lb1. The second DC/DC converter 3 (#6) is connected to the respective disk drives 1 (#1, #3, #5, #7) via the path Lb2.

In other words, the respective DC/DC converters 3 (#5, #6) in the redundant power supply substrates 2B are connected to the disk drives 1 with the same rank in the respective subgroups SG. In other words, in the leftmost subgroup SG in FIG. 1, the disk drive 1 (#0) is ranked first and the disk drive 1 (#1) is ranked second. In the adjacent subgroup SG, the disk drive 1 (#2) is ranked first and the disk drive 1 (#3) is ranked second. In the next adjacent subgroup SG, the disk drive 1 (#4) is ranked first and the disk drive 1 (#5) is ranked second. In the rightmost subgroup SG, the disk drive 1 (#6) is ranked first and the disk drive 1 (#7) is ranked second.

When the focus is on a perspective such as the ranking within the subgroup, the first DC/DC converter 3 (#5) is connected to the first ranking disk drives 1 (#0, #2, #4, #6) in the respective subgroups SG while the other DC/DC converter 3 (#6) is connected to the second ranking disk drives 1 (#1, #3, #5, #7) in the respective subgroups SG.

As outlined above, the respective disk drives 1 in the respective subgroups SG are each connected to a plurality of DC/DC converters 3. For example, disk drive1 (#0) is connected to the DC/DC converter 3 (#1) in the normal power supply substrate 2A and DC/DC converter 3 (#5) in the redundant power supply substrate 2B; disk drive 1 (#1) is connected to the DC/DC converter 3 (#1) in the normal power supply substrate 2A and the DC/DC converter 3 (#6) in the redundant power supply substrate 2B; disk drive 1 (#2) is connected to the DC/DC converter 3 (#2) in the normal power supply substrates 2A and the DC/DC converter 3 (#5) in the redundant power supply substrate 2B; disk drive 1 (#3) is connected to the DC/DC converter 3 (#2) in the normal power supply substrate 2A and DC/DC converter 3 (#6) in the redundant power supply substrate 2B. The same is also true for each of the other disk drives 1 (#4 to #7). Hence, the details will be described subsequently, but, even in cases where the operation of either DC/DC converter 3 has stopped, power is supplied by the other DC/DC converter 3 to the disk drives 1.

The AC/DC power supply sections 4 are connected to the respective DC/DC converters 3 and supplies DC power thereto. Each AC/DC power supply section 4 has an OR connection. In other words, even in cases where the operation of either one AC/DC power supply section 4 has stopped, DC power is supplied by the other AC/DC power supply section 4 to the respective DC/DC converters 3.

Respective power supply control sections 5 are constituted as electronic circuits for controlling the operation of the respective normal power supply substrates 2A and the redundant power supply substrate 2B. The respective DC/DC converters 3 in the respective substrates 2A and 2B are each connected to the power supply control sections 5. The respective DC/DC converters 3 start to supply power or stop the supply of power in response to an instruction from the power supply control sections 5. The respective DC/DC converters 3 report the state of their own operations to the power supply control sections 5.

In FIG. 1, a plurality of power supply control sections 5 are provided. In this embodiment, the power supply control section 5 at the top of FIG. 1 is charged with controlling the respective DC/DC converters 3 in the respective normal power supply substrates 2A while the power supply control section 5 at the bottom of FIG. 1 is charged with controlling the respective DC/DC converters 3 in the redundant power supply substrate 2B. The constitution is not limited to such an arrangement; the constitution may be such that one power supply control section 5 controls the respective DC/DC converters 3 in the respective normal power supply substrates 2A and redundant power supply substrate 2B.

The respective power supply control sections 5 cause DC power to be output by the respective DC/DC converters 3 or cause the power output from the respective DC/DC converters 3 to be stopped on the basis of an instruction that is input via a management section 6. Further, the respective power supply control sections 5 acquire the states of the respective DC/DC converters 3 under their respective control and report the acquired states to the management section 6. For example, the respective DC/DC converters 3 output a signal indicating whether they are working normally to the power supply control sections 5. The power supply control sections 5 are able to detect whether the respective DC/DC converters 3 are working normally by reading the signals from the respective DC/DC converters 3.

The management section 6 is connected to the respective power supply control sections 5. The management section 6 manages the respective power supply control sections 5 and can be connected to a management terminal outside the storage control device, for example.

The power supply device of this embodiment comprises the above constitution. Hence, even when a power fault occurs in either of the disk drives 1, the adverse effect of the power fault can be prevented from impacting the other disk drive 1, whereby reliability improves.

This will be described by way of an example. For example, in the internal circuit of the disk drive (#1), suppose that a line carrying a DC current of 5 volts is subject to a short-circuit. In this case, a protective circuit such as an over current protection circuit or a low-voltage detection circuit operates in each of the DC/DC converters 3 (#1, #6) connected to the disk drive 1 (#1). Hence, the operation of the respective DC/DC converters 3 (#1, #6) is stopped.

When the operation of the DC/DC converter 3 (#1) in the normal power supply substrate 2A is stopped, the supply of power to the respective disk drives 1 (#0, #1) connected to the DC/DC converter 3 (#1) also stops. However, DC power is also supplied by the DC/DC converter 3 (#5) in the redundant power supply substrate 2B to the disk drive 1 (#0). Hence, the operation of the disk drive 1 (#0) is continued.

In the meantime, when the operation of the DC/DC converter 3 (#6) in the redundant power supply substrate 2B stops, the redundant configuration of the DC power supply relating to the disk drives 1 (#1, #3, #5, #7) connected to the DC/DC converter 3 (#6) fails.

However, DC power is supplied by the DC/DC converter 3 (#2) in the normal power supply substrate 2A to the disk drive 1 (#3). DC power is supplied by the DC/DC converter 3 (#3) in the normal power supply substrate 2A to the disk drive 1 (#5). DC power is supplied by the DC/DC converter 3 (#4) in the normal power supply substrates 2A to the disk drive 1 (#7). Hence, the respective disk drives 1 (#3, #5, #7) connected to the stopped DC/DC converter 3 (#6) continue to operate.

A case where a power fault occurs in any of the other disk drives 1 is also the same. When a power fault occurs in any of the disk drives 1, a plurality of DC/DC converters 3 connected to the disk drives 1 stop operating. However, DC power is supplied by any one of the DC/DC converters 3 in the normal power supply substrates 2A or the DC/DC converters 3 in the redundant power supply substrate 2B to the normal other disk drive 1.

That is, in the case of the power supply device of this embodiment, because the DC/DC converters 3 provided outside the disk drives 1 have a redundant configuration, even when a power fault occurs in any one of the disk drives 1, the adverse effect of the power fault on the other normal disk drive 1 can be prevented.

Furthermore, in this embodiment, the constitution is such that the DC/DC converters 3 in the normal power supply substrates 2A correspond with each of the disk drives 1 in the corresponding subgroups SG and such that the DC/DC converters 3 in the redundant power supply substrate 2B correspond with any one of the disk drives 1 in all the subgroups SG. As a result, this embodiment is constituted so that the respective disk drives 1 are capable of being supplied with power from both the DC/DC converters 3 in the normal power supply substrates 2A and the DC/DC converters 3 in the redundant power supply substrate 2B.

As a result of such a constitution, in this embodiment, power can be supplied individually to each of the disk drives 1. For example, in other words, in the example above, by stopping the respective operation of the DC/DC converter 3 (#1) and DC/DC converter (#6), only the supply of power to the disk drives 1 (#1) can be stopped. In this case, because DC power is supplied by another DC/DC converter 3 to the other disk drives 1 (#0, #2 to #7), there is no adverse effect on the operation of the other disk drives 1 (#0, #2 to #7). Hence, after stopping the supply of power to only disk drive 1 (#1), disk drive 1 (#1) can be removed and exchanged for a new disk drive 1.

Thus, in this embodiment, the supply of DC power to the respective disk drives 1 can be individually controlled by the DC/DC converters 3 provided outside the disk drives 1. Hence, in a case where a disk drive 1 is exchanged for the sake of maintenance work and so forth, only the supply of power to the disk drive 1 which is the exchange target is stopped in order to be able to exchange this disk drive 1 for a new disk drive 1. DC power is then supplied to the new disk drive 1 to place same in an operational state.

As a result, in this embodiment, there is no need to provide an electrical circuit for a hot swap in the disk drives 1. This is because the disk drives 1 can be removed after completely stopping the power supply and then the power supply can be re-started after removing the new disk drive 1. Hence, there is no need to provide a DC/DC converter in the disk drive 1 and it is not necessary to provide an electrical circuit to permit a hot swap. Therefore, the fabrication costs of the disk drive 1 can be reduced.

Furthermore, in this embodiment, the constitution is such that the disk drive 1 and DC/DC converter 3 are provided separately and a plurality of disk drives 1 are managed in groups by a plurality of DC/DC converters 3. Hence, the number of DC/DC converters 3 can be made markedly smaller than in the case of the first conventional technology and the fabrication costs of the power supply device can be reduced.

In addition, in this embodiment, as mentioned earlier, because it is possible to individually control the supply of power to the respective disk drives 1, there are also cases where the points where power faults occur can be specified. That is, when the operation of a certain disk drivel is stopped, it is confirmed whether the operation of the DC/DC converter 3 supplying DC power to the disk drive 1 whose operation has been stopped has been halted. If any of the DC/DC converters 3 has stopped, it can be judged that a power fault has occurred in the disk drive 1.

In addition, in this embodiment, the constitution is such that one redundant power supply substrate 2B is made to correspond with a plurality of normal power supply substrates 2A. Hence, the number of redundant power supply substrates 2B can be made small in comparison with that of the second conventional technology. As a result, the constitution of the power supply device can be simplified and miniaturized and the space of the storage control device can be used effectively. The power supply device of this embodiment will be described in detail hereinbelow.

First Embodiment

Figure 2:
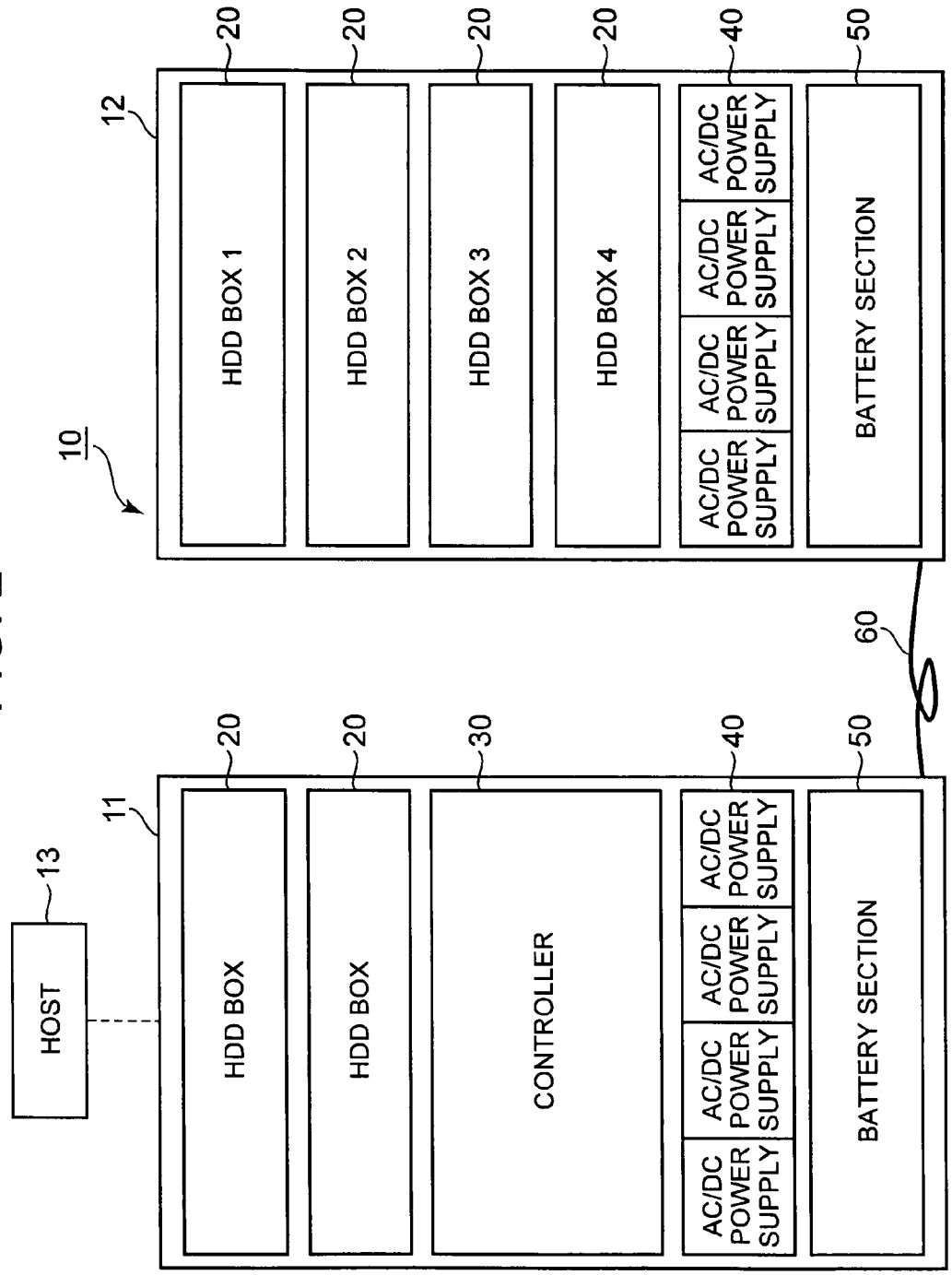
FIG. 2 is an explanatory diagram that schematically shows the overall constitution of the storage control device.

FIG. 2 is an explanatory diagram that schematically shows the constitution of a storage control device 10. FIG. 2 is represented to resemble a front view but differs from an actual front view.

The storage control device 10 can be constituted by connecting a basic enclosure 11 and an additional enclosure 12 by means of a cable 60, for example. The storage control device 10 may also be constituted by the basic enclosure 11 alone.

The basic enclosure 11 provides the basic constitution of the storage control device 10 and the basic functions of the storage control device 10 can be implemented by means of the basic enclosure 11 alone. The basic enclosure 11 is constituted comprising, for example, a plurality of hard disk boxes ('HDD boxes' hereinbelow) 20, a controller 30, an AC/DC power supply section 40, and a battery section 50. A host 13 serving as a higher-level device is connected via a communication network to the basic enclosure 11.

The additional enclosure 12 is prepared as an optional product and is used to reinforce the storage capacity of the storage control device 10. The additional enclosure 12 comprises, for example, a plurality of the HDD boxes 20, the AC/DC power supply section 40, and the battery section 50. The respective enclosures 11 and 12 have an individual power supply constitution. Further, the constitution of the storage control device 10 is not limited to that shown in FIG. 2. For example, the constitution of the storage control device 10 may be one in which the HDD boxes are removed from the basic enclosure 11 and only the control function is provided.

Figure 3:
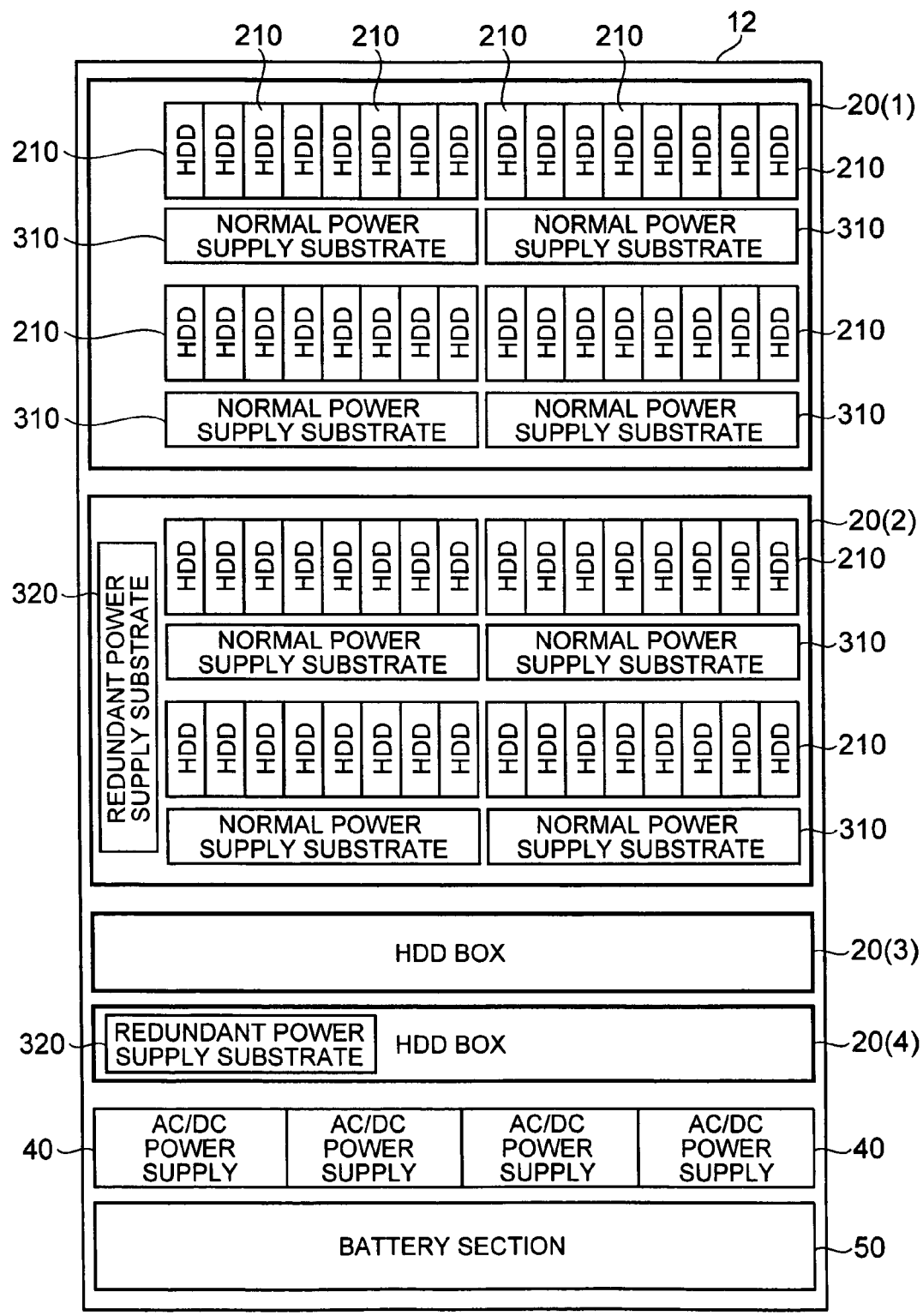
FIG. 3 is an explanatory diagram that schematically shows a case where the storage control device is seen from the front view.

The respective HDD boxes 20 comprise a plurality of disk drives 210 (See FIG. 3). The constitution of the respective HDD boxes 20 will be described subsequently. The controller 30 is charged with the control function of the storage control device 10. The constitution of the controller 30 will be described subsequently together with FIG. 4.

The AC/DC power supply section 40 converts AC power supplied from the outside into DC power of about a dozen volts to several dozen volts, for example. The same is also true in the following description, with the voltage values merely serving as examples; the present invention is not limited to the voltage values appearing in the embodiments.

The battery section 50 supplies DC power supplies DC power for emergency purposes when AC power from the outside is stopped as a result of a power outage or the like, for example. Accordingly, when a power outage or the like occurs, write data stored in a cache memory 130 (See FIG. 4) are written to the disk drive 210 by using the power supply from the battery section 50.

FIG. 3 is a schematic view from the front side of the additional enclosure 12; this view is not an accurate front view. The additional enclosure 12 comprises four HDD boxes 20 at the front side, for example. Sixteen disk drives 210 are mounted at the top and bottom respectively, for example, of the respective HDD boxes 20. One drive group DG (See FIG. 5) is constituted by eight disk drives 210. In other words, a plurality of (four) drive groups DG are provided in the respective HDD boxes 20. A normal power supply substrate 310 is provided in correspondence with each of the drive groups DG below the column of the disk drives 210 of each level.

When the second HDD box 20(2) is considered, a redundant power supply substrate 320 is provided in addition to the plurality of disk drives 210 and the plurality of normal power supply substrates 310, within the HDD box 20(2). Likewise, a redundant power supply substrate 320 is also provided in the fourth HDD box 20(4). The first HDD box 20(1) and third HDD box 20(3) do not comprise a redundant power supply substrate 320. That is, in this embodiment, one redundant power supply substrate 320 is provided for two HDD boxes 20. As mentioned earlier, four drive groups DG are provided within one HDD box 20. Hence, in this embodiment, one redundant power supply substrate 320 is thus assigned to eight drive groups DG. Further, the number of drive groups DG supported by one redundant power supply substrate 320 (that is, this number is equal to the number of normal power supply substrates 310) is not limited to eight. The constitution of the normal power supply substrates 310 and redundant power supply substrate 320 will be described subsequently.

Figure 4:
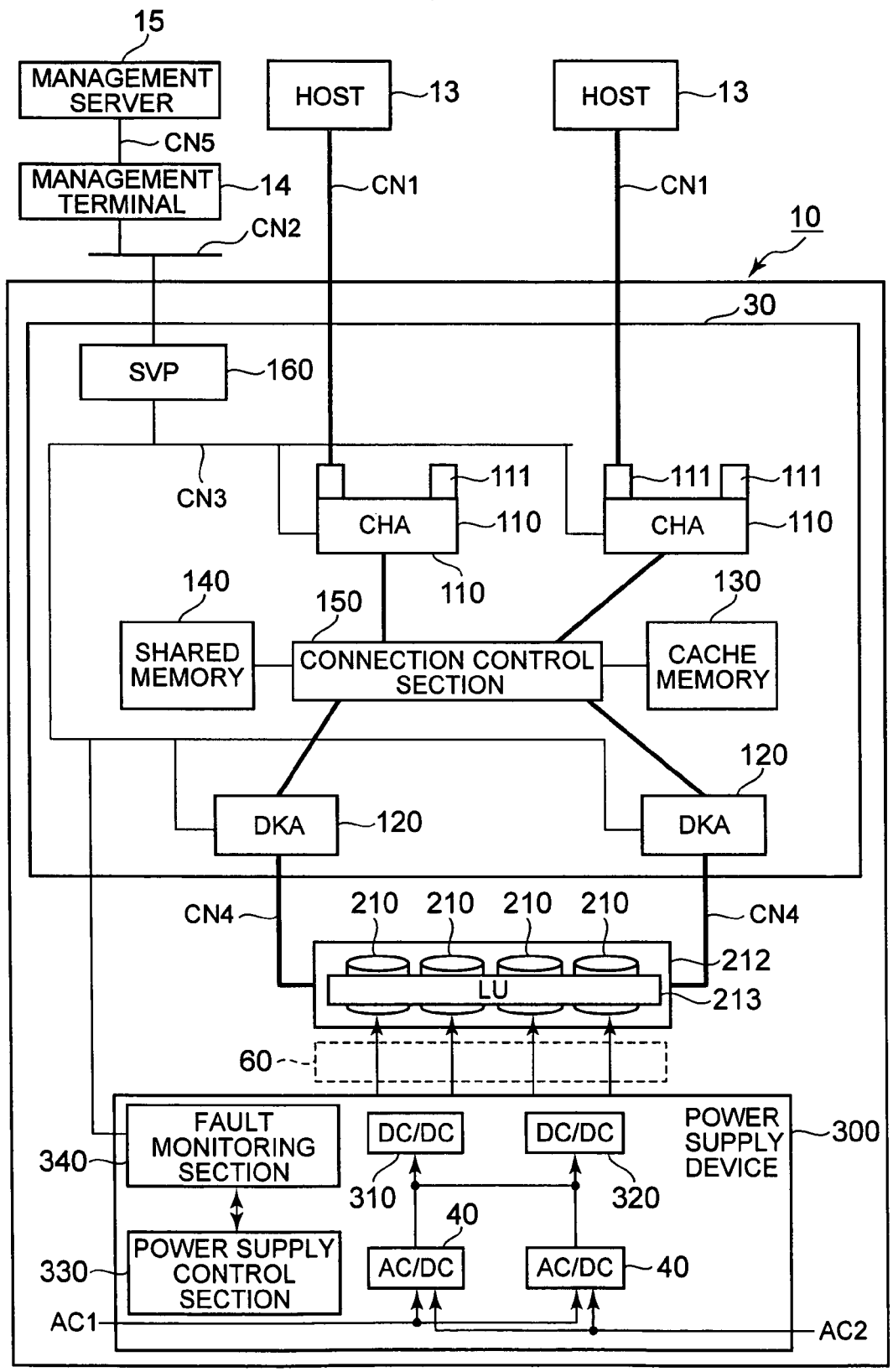
FIG. 4 is a block diagram of the storage control device.

The respective HDD boxes 20 are provided with a plurality of AC/DC power supply sections 40 via a back board 60 (See FIG. 4). A back board 60 for electrically connecting the respective parts is provided between the respective disk drives 210 and the respective AC/DC power supply sections 40. In FIG. 3, the AC/DC power supply sections 40 are suitably disposed below the front side of the additional enclosure 12 but, as mentioned earlier, the AC/DC power supply sections 40 can be provided on the rear side of the additional enclosure 12.

In this embodiment, a redundant configuration relating to the supply of DC power is formed by taking a predetermined number (two) of the HDD boxes 20 as one management unit. Further, the predetermined number is not limited to two. For example, the constitution relating to the supply of DC power may be made redundant by taking four or eight HDD boxes 20 as one management unit.

The disk drive 210 of this embodiment is constituted as a hard disk drive such as an ATA (AT Attachment) disk drive, an SCSI (Small Computer System Interface) disk drive, or an FC (Fibre Channel) disk drive, for example. The disk drive 210 is not limited to such disks; other storage devices such as a semiconductor memory drive (including flash memory devices), an optical disk drive, or a magneto-optical disk drive may also be used, for example. The disk drive 210 corresponds to the disk drive 1 in FIG. 1.

The details will be described subsequently. However, a RAID group 212 (See FIG. 4) is constituted by a predetermined number of disk drives 210 such as one set of four or one set of eight, for example. The RAID group 212 is constituted to straddle different drive groups DG. In other words, the RAID group 212 is constituted by a plurality of disk drives 210 each of which is selected from among individual drive groups DG.

FIG. 4 is a block diagram of the storage control device 10. First, the whole of the storage system that comprises the storage control device 10 will be described and the details of the controller 30 will be described next.

The storage control device 10 can be connected to a plurality of hosts 13 via a communication network CN1. The hosts 13 access the storage control device 10 in accordance with a request from the client terminal (not included in FIG. 4), for example, and perform data reading/writing. Examples of the host 13 can include, for example, a mainframe computer or server computer or the like. Examples of the communication network CN1 can include, for example, a LAN (Local Area Network), a SAN (Storage Area Network), the Internet, or a dedicated line.

When a LAN is used, the host computers 13 and storage control device 10 communicate in accordance with TCP/IP (Transmission Control Protocol/Internet Protocol), for example. When a SAN is used, the host computers 13 and storage control device 10 communicate in accordance with the Fiber Channel protocol, for example. Further, when the host computers 13 are mainframe computers, data transfers are carried out in accordance with a communication protocol such as the FICON (Fibre Connection: registered trade name) communication protocol, the ESCON (Enterprise System Connection: registered trade name) communication protocol, the ACONARC (Advanced Connection Architecture: registered trade name) communication protocol, or the FIBARC (Fibre Connection Architecture: registered trade name) communication protocol, for example.

A management terminal 14 can also be connected via a management communication network CN2 to the storage control device 10. The management terminal 14 is a computer terminal for performing various settings for the storage control device 10. The management terminal 14 can be connected to a management server 15 via the communication network CN5. The management server 15 is a computer device that is capable of managing a plurality of storage control devices 10 collectively. Examples of the communication networks CN2 and CN5 can include a LAN or the Internet or the like, for example.

The constitution of the controller 30 will be described next. The controller 30 can be constituted comprising, for example, a channel adapter ('CHA' hereinbelow) 110, a disk adapter ('DKA' hereinbelow) 120, the cache memory 130, a shared memory 140, a connection control section 150, and a service processor ('SVP' hereinbelow) 160.

The respective CHA110 control the data transfer between the respective hosts 13 and, therefore, comprise a plurality of communication ports 111. The storage control device 10 can comprise a plurality of CHA110. The CHA110 are prepared in accordance with the type of host 13 as open server CHA or mainframe CHA or the like, for example. The respective CHA110 receive commands requesting the reading and writing of data from the hosts 13 connected to the respective CHA110 and operate in accordance with the commands received from the hosts 13.

The respective DKA 120 can be provided in a plurality in the storage control device 10. Each of the DKA 120 controls data communications between the respective disk drives 210. The respective DKA 120 and respective disk drives 210 are connected via a communication network CN4 such as a SAN, for example and perform data transfers in block units in accordance with the Fiber Channel protocol. The respective DKA 120 monitor the states of the disk drives 210 on an as-needed basis and the monitoring result is transmitted to the SVP 160 via an internal network CN3.

Further, the respective CHA110 and respective DKA 120 can also each be constituted as separate control circuit substrates or the CHA function and DKA function can be provided on one control circuit substrate.

The cache memory 130 stores user data or the like, for example. The cache memory 130 can be constituted by an involatile memory, for example but can also be constituted by a volatile memory. In cases where the cache memory 130 is constituted by a volatile memory, the cache memory 130 is backed up by the battery section 50.

The shared memory (or control memory) 140 stores various control information and management information and so forth for controlling the operation of the storage control device 10. The shared memory 140 is constituted by an involatile memory, for example. The control information and so forth can be multiplexed and managed by a plurality of shared memories 140.

Further, the cache memory 130 and shared memory 140 may be constituted as separate memory circuit substrates or the cache memory 130 and shared memory 140 may be mounted in one memory circuit substrate. Furthermore, the constitution may be such that a portion of the cache memory is used as a control region for storing control information and another part is used as a cache region for storing data.

The connection control section 150 connects the respective CHA110, the respective DKA 120, the cache memory 130, and the shared memory 140. As a result, all the CHA110 and DKA 120 are able to access the cache memory 130 and shared memory 140. The connection control section 150 is constituted by a crossbar switch, for example.

The SVP 160 is connected to the respective CHA110 and the respective DKA 120 via the internal network CN3 such as a LAN. The SVP 160 is also connected to the power supply device 300. The SVP 160 is connected to the management terminal 14 via the communication network CN2, collects the various states in the storage control device 10 and supplies these states to the management terminal 14. Further, the management terminal 14 or management server 15 is also able to change the constitution and so forth of the storage control device 10 via the SVP 160.

As mentioned earlier, the controller 30 can be constituted by mounting substrates of a plurality of types (CHA110, DKA 120 and so forth) in a controller enclosure. The constitution of the controller 30 is not limited to such a constitution and may instead be a constitution in which each of the above functions (the function for communicating with the hosts 13, the function for communicating with the disk drives 210, and the data processing function and so forth) are provided on a single control substrate. In this case, a plurality of control substrates are provided to establish a redundant constitution, which is preferable from the perspective of improving the reliability of the storage control device 10.

The data I/O processing by the controller 30 will first be described. The CHA110 stores a read command that is received from the host 13 in the shared memory 140. When the DKA 120 references the shared memory 140 on an as-needed basis and discovers the read command, data are read from the disk drive 210 and stored in the cache memory 130. The CHA110 reads data that has been copied to the cache memory 130 and transmits same to the host 13.

Upon receipt of a write command from the host 13, the CHA110 stores the write command in the shared memory 140. The CHA110 stores received write data in the cache memory 130. After storing the write data in the cache memory 130, the CHA110 reports the completion of writing to the host 13. The DKA 120 reads write data stored in the cache memory 130 in accordance with the write command stored in the shared memory 140 and stores the write data in a predetermined disk drive 210. The constitution may also be such that, after writing the write data to the disk drive 210, the DKA 120 reports the completion of writing to the host 13.

Here, the user data stored only in the cache memory 130 are called dirty data and the data stored in both the cache memory 130 and the disk drive 210 are called clean data. The clean data can be erased and are erased when the blank region in the cache memory 130 is insufficient, for example. In cases where a fault of some kind occurs in the power supply system of the storage control device 10, dirty data stored in the cache memory 130 are stored in the disk drive 210 within the operating time the storage control device 10 is maintained by the battery section 50.

As shown in the lower half of FIG. 4, the RAID group 212 is constituted by a predetermined number of disk drives 210. The RAID group 212 that uses parity such as RAID5 is also sometimes called a parity group. The RAID group 212 constitutes a redundant storage region on the basis of the physical storage regions of the respective disk drives 210. One or a plurality of logical storage regions (LU) 213 can be established in a physical storage region provided in the RAID group 212. This logical storage region 213 is called a logical volume or a logical storage device.

As shown further down FIG. 4, a power supply device 300 is also provided in the storage control device 10. The power supply device 300 supplies predetermined DC power to each of the disk drives 210 and controller 30.

The details of the power supply device 300 will be provided subsequently but the power supply device 300 will be described first in simple terms. The power supply device 300 is constituted comprising, for example, the normal power supply substrate 310, the redundant power supply substrate 320, a plurality of the power supply control section 330, a plurality of the AC/DC power supply sections 40, and one fault monitoring section 340. The power supply device 300 and each of the disk drives 210 are connected via wiring which is formed on the backboard 60. Further, in FIG. 4, the power supply substrates 310 and 320 are represented as 'DC/DC' due to space constraints on the page.

Figure 5:
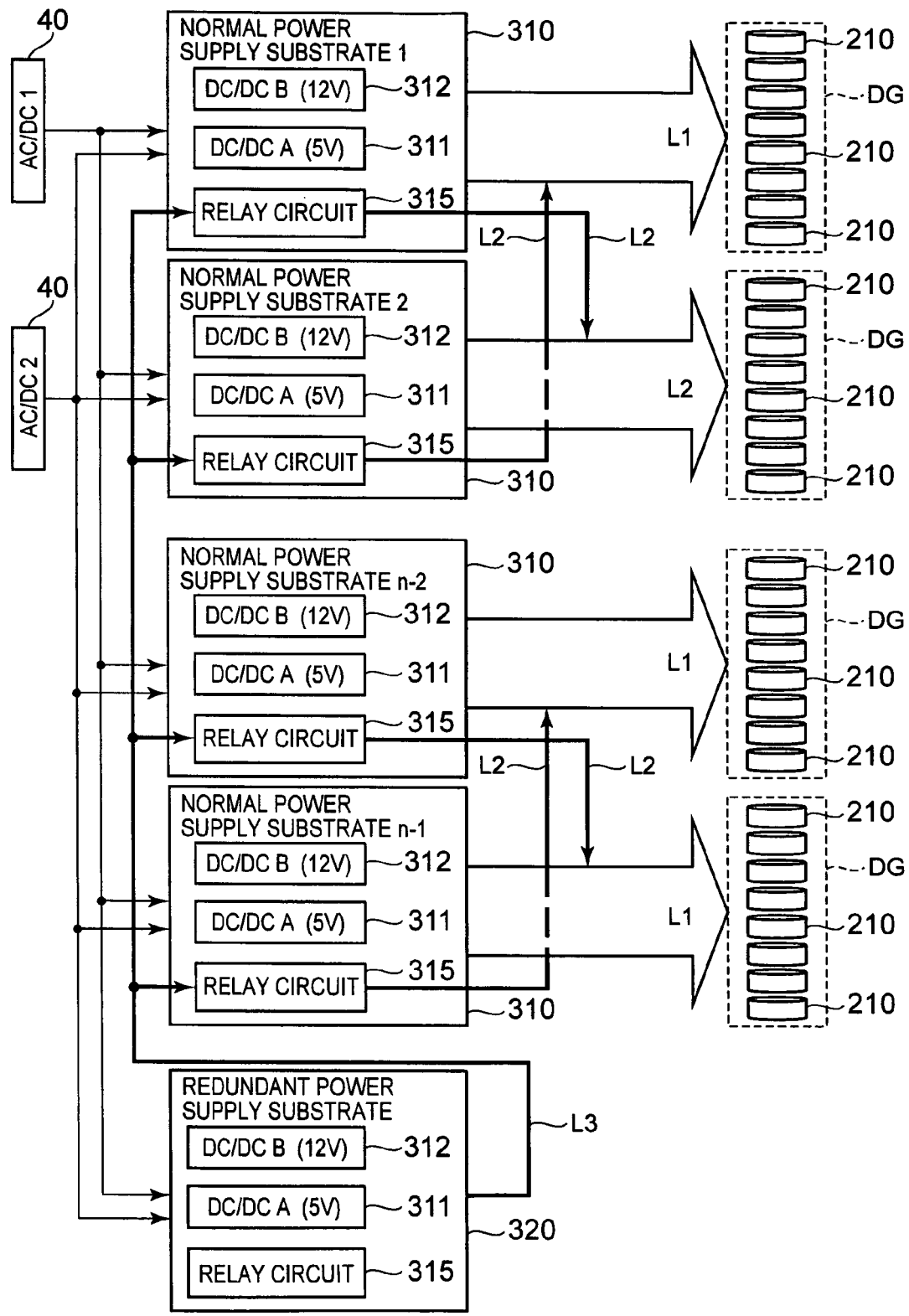
FIG. 5 is an explanatory diagram showing an aspect in which the structure for supplying power to the respective disk drives is made redundant by associating one redundant power supply substrate with a plurality of normal power supply substrates.

FIG. 5 is an explanatory diagram schematically showing the connection relationships within the power supply device 300. In this embodiment, as mentioned hereinabove, the constitution is such that one redundant power supply substrate 320 is assigned to eight drive groups DG. Due to space constraints on the page, in the drawings referenced hereinbelow, the illustration emphasizes some of the drive groups DG among the eight drive groups DG.

Normal power supply substrates 310 are assigned on a one-for-one basis to the respective drive groups DG. The respective normal power supply substrates 310 supply DC power to each of the disk drives 210 in the corresponding drive groups DG via a first path L1.

Figure 6:
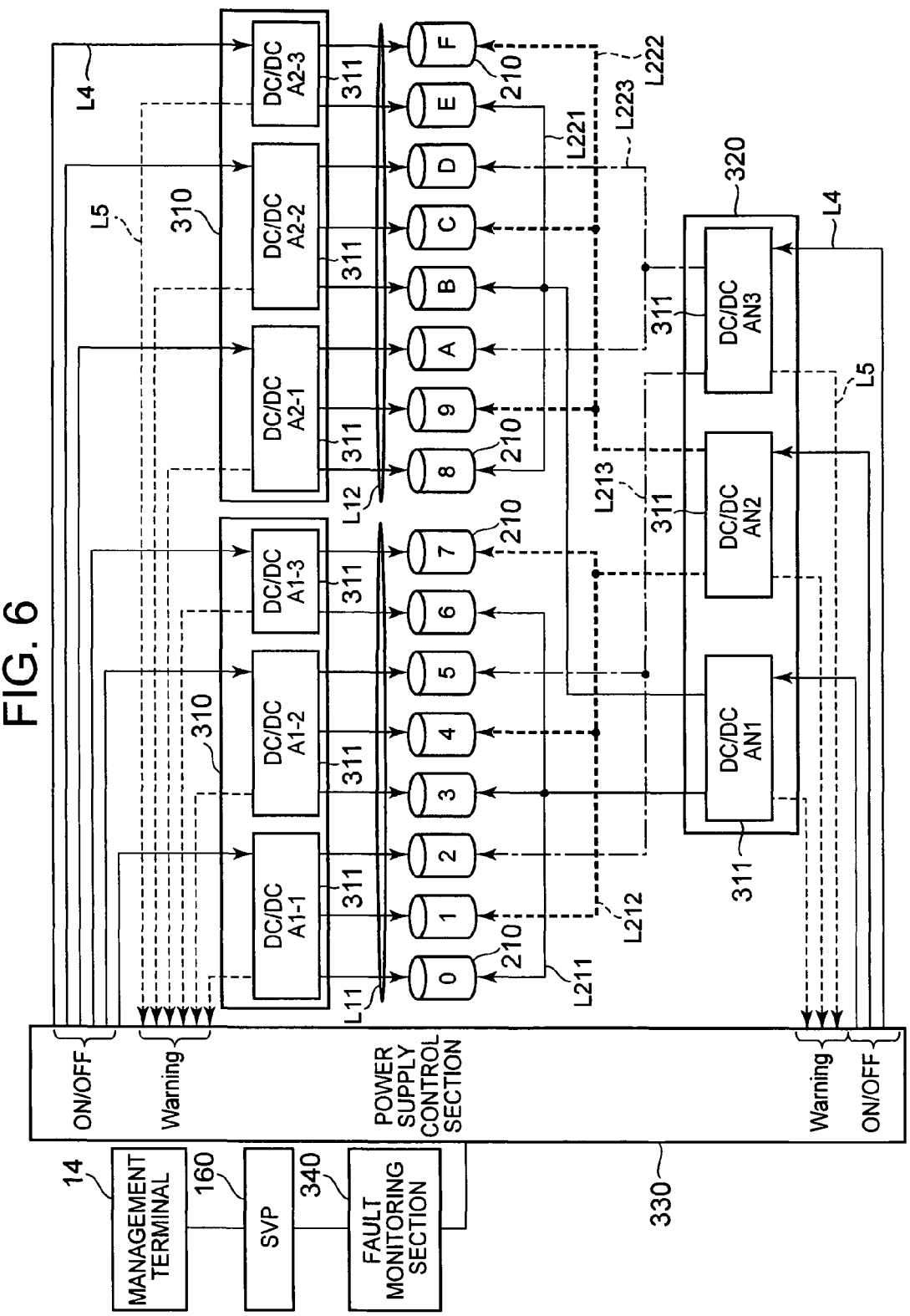
FIG. 6 is an explanatory diagram showing a state where the respective disk drives constituting drive groups and the respective DC/DC converters are connected.

The respective normal power supply substrates 310 comprise the DC/DC converters 311 and 312 respectively. The first DC/DC converter 311 outputs power of about DC 5V, for example. A plurality of the DC/DC converter 311 are provided as shown in FIG. 6 and so forth. In FIG. 5, due to space constraints on the page, one DC/DC converter 311 is shown. The other DC/DC converter 312 outputs power of about DC 12V, for example.

A relay circuit 315 is a circuit for transmitting DC power that is supplied by the redundant power supply substrate 320 to DC power that is output by predetermined other normal power supply substrates 310. In this embodiment, one redundant pair is constituted by two normal power supply substrates 310. The relay circuits 315 of the respective normal power supply substrates 310 constituting the redundant pair are mutually OR-connected via a second path L2 midway along the first path L1 that is connected to the counterpart normal power supply substrates 310.

In the example shown in FIG. 5, the normal power supply substrate 310 (1) and normal power supply substrate 310 (2), and the normal power supply substrate 310 (n−2) and normal power supply substrate 310 (n−1) each constitute a redundant pair. The relay circuit 315 of the normal power supply substrate 310 (1) is connected to the first path L1 of the normal power supply substrate 310 (2) via the second path L2. Likewise, the relay circuit 315 of the normal power supply substrate 310 (2) is connected to the first path L1 of the normal power supply substrate 310 (1) via the second path L2. The normal power supply substrates 310 (n−2) and 310 (n−1) are similarly constituted.

That is, in this embodiment, the plurality of normal power supply substrates 310 constituting the redundant pair mutually provide a path for supporting the counterpart DC power supply (relay circuit 315). In other words, the DC power supply supplied by the respective normal power supply substrates 310 is supported by the other normal power supply substrate 310 and redundant power supply substrate 320 constituting the redundant pair.

The redundant power supply substrate 320 is constituted comprising DC/DC converters 311 and 312 and the relay circuit 315 as per the normal power supply substrates 310. However, in this embodiment, the relay circuit 315 of the redundant power supply substrate 320 is not used. The DC power that is output by the redundant power supply substrate 320 is supplied to each of the relay circuits 315 via a third path L3. The relay circuits 315 in the respective normal power supply substrates 310 outputs DC power that is input from the path L3 to path L2. Path L2 is OR-connected midway along path L1.

Here, settings are made in advance in this embodiment so that the voltage value on path L2 is lower than the voltage value on path L1. By setting the voltage value of the backup path L2 lower than the voltage value of the main path L1, normally, DC power is supplied to the respective disk drives 210 from path L1 alone. During abnormal times when DC power is not being supplied to path L1, DC power from the redundant power supply substrate 320 is supplied to each of the disk drives 210 via path L2 which is connected to path L1.

A variety of methods can be adopted as the method for lowering the voltage value of the path L2 below the voltage value of the path L1. One such method that can be cited is a method that involves increasing the number of diodes provided in path L2 to a number below the number of diodes provided in path L1. For example, the voltage values of paths L1 and L2 can be made different from one another by providing a diode in the relay circuits 315 to change the numbers of diodes in path L1 and path L2. Another such method that can be cited is a method that involves lowering the voltage value of the DC power that is output by the redundant power supply substrate 320.

Figure 8:
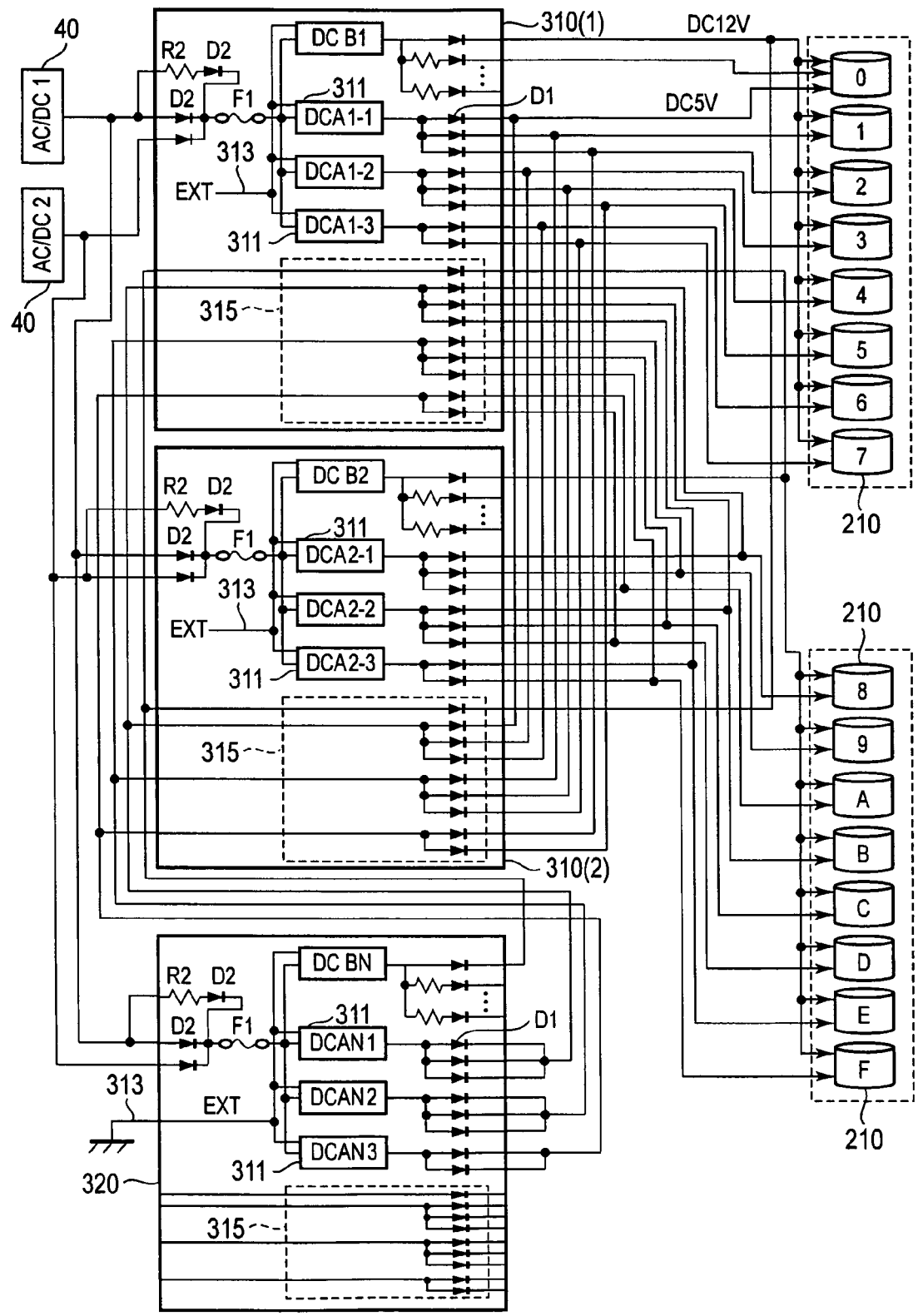
FIG. 8 is a circuit diagram showing the power supply structure.
Figure 9:
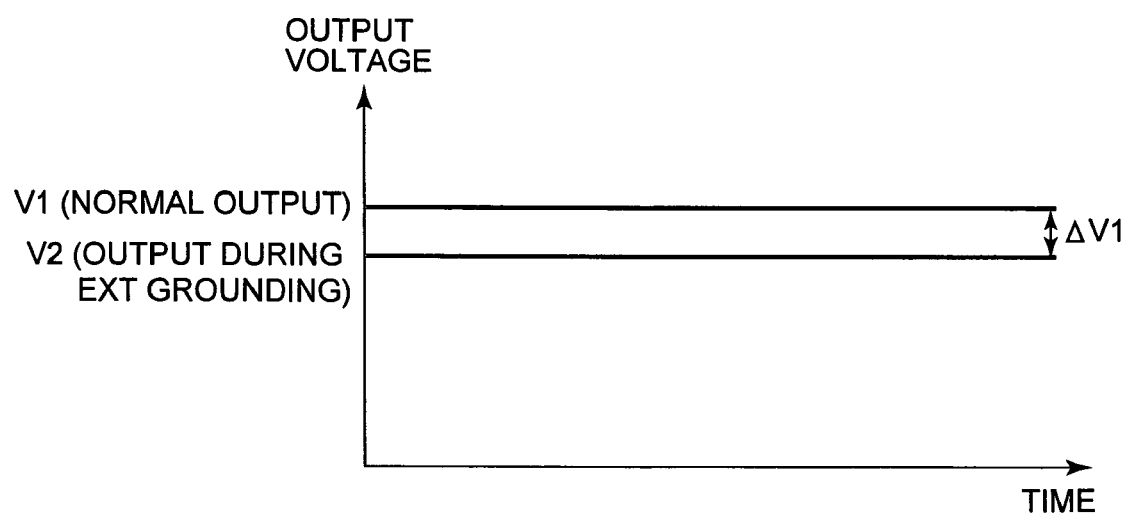
FIG. 9 is a graph showing the relationship between the value of the voltage output by the redundant power supply substrate and the value of the voltage output by the normal power supply substrate.

FIG. 6 is a circuit diagram that schematically shows a structure for supplying power to the respective disk drives 210 constituting the drive groups DG. In FIG. 6, the power supply structure is shown schematically in order to explain the present invention. A more detailed structure is shown in FIGS. 8 and 9.

The respective drive groups DG each comprise eight disk drives 210. In FIG. 6, numbers (#0 to #F) serving to identify the respective disk drives 210 are added. The eight disk drives 210 with the labels #0 to #7 constitute one drive group DG and the eight disk drives 210 with the labels #8 to #F constitute one other drive group DG.

Further, three subgroups are provided in each of the drive groups DG. The subgroups are constituted by two or three disk drives 210. In the example shown, in the drive group DG shown on the left-hand side, the disk drives 210 with the labels #0 to #2, the disk drives 210 with the labels #3 to #5, and the disk drives 210 with the labels #6 and 7 constitute the respective drive groups. Likewise, in the drive group DG shown on the right-hand side, the disk drives 210 with the labels #8 to #A, the disk drives 210 with the labels #B to #D, and the disk drives 210 with the labels #E and #F constitute the respective subgroups.

A plurality of DC/DC converters 311 are installed in the respective normal power supply substrates 310 and the redundant power supply substrate 320. Here, the DC/DC converters 311 (A1-1, A1-2, A1-3, A2-1, A2-2, A2-3) in the respective normal power supply substrates 310 shown in the upper half of FIG. 6 can be called main DC/DC converters. The DC/DC converters 311 (AN1, AN2, AN3) in the redundant power supply substrate 320 shown in the lower half of FIG. 6 can be called secondary DC/DC converters.

As detailed earlier, the respective normal power supply substrates 310 correspond with the drive groups DG on a one-for-one basis. The main DC/DC converters 311 (A1-1, A1-2, A1-3, A2-1, A2-2, A2-3) correspond with the subgroups in the corresponding drive groups DG. That is, the respective DC/DC converters 311 correspond with the subgroups on a one-for-one basis.

For example, the DC/DC converter 311 (A1-1) corresponds with the subgroup comprising the three disk drives 210 with the labels #0 to #2; the DC/DC converter 311 (A1-2) corresponds with the subgroup comprising the three disk drives 210 with the labels #3 to #5; and the DC/DC converter 311 (A1-3) corresponds with the subgroup comprising two disk drives 210 with the labels #6 and #7. The DC/DC converters 311 (A1-1, A1-2, A1-3) are connected by a path L11.

Likewise, the DC/DC converter 311 (A2-1) corresponds with the subgroup comprising the three disk drives 210 with the labels #8 to #A; the DC/DC converter 311 (A2-2) corresponds with the subgroup comprising the three disk drives 210 with the labels #B to #D; and the DC/DC converter 311 (A2-3) corresponds with the subgroup comprising two disk drives 210 with the labels #E and #F. The DC/DC converters 311 (A2-1, A2-2, A2-3) are connected by a path L12.

Here, in FIG. 6, the first path L1 is shown split into L11 and L12. The respective paths L11 and L12 comprise lines of the same number as that of disk drives 210 corresponding with the respective main DC/DC converters 311 (A1-1 to A1-3, A2-1 to A2-3 respectively).

In FIG. 6, the second path L2 is shown split into L211 to L213 and L221 to L223. L211 and L221, which are indicated by solid lines, are lines that are connected to the first secondary DC/DC converter (AN1). L212 and L222, which are indicated by a dotted line, are lines that are connected to the second secondary DC/DC converter (AN2). L213 and L223, which are indicated by a dot-chain line, are lines that are connected to the third secondary DC/DC converter (AN3).

Figure 7:
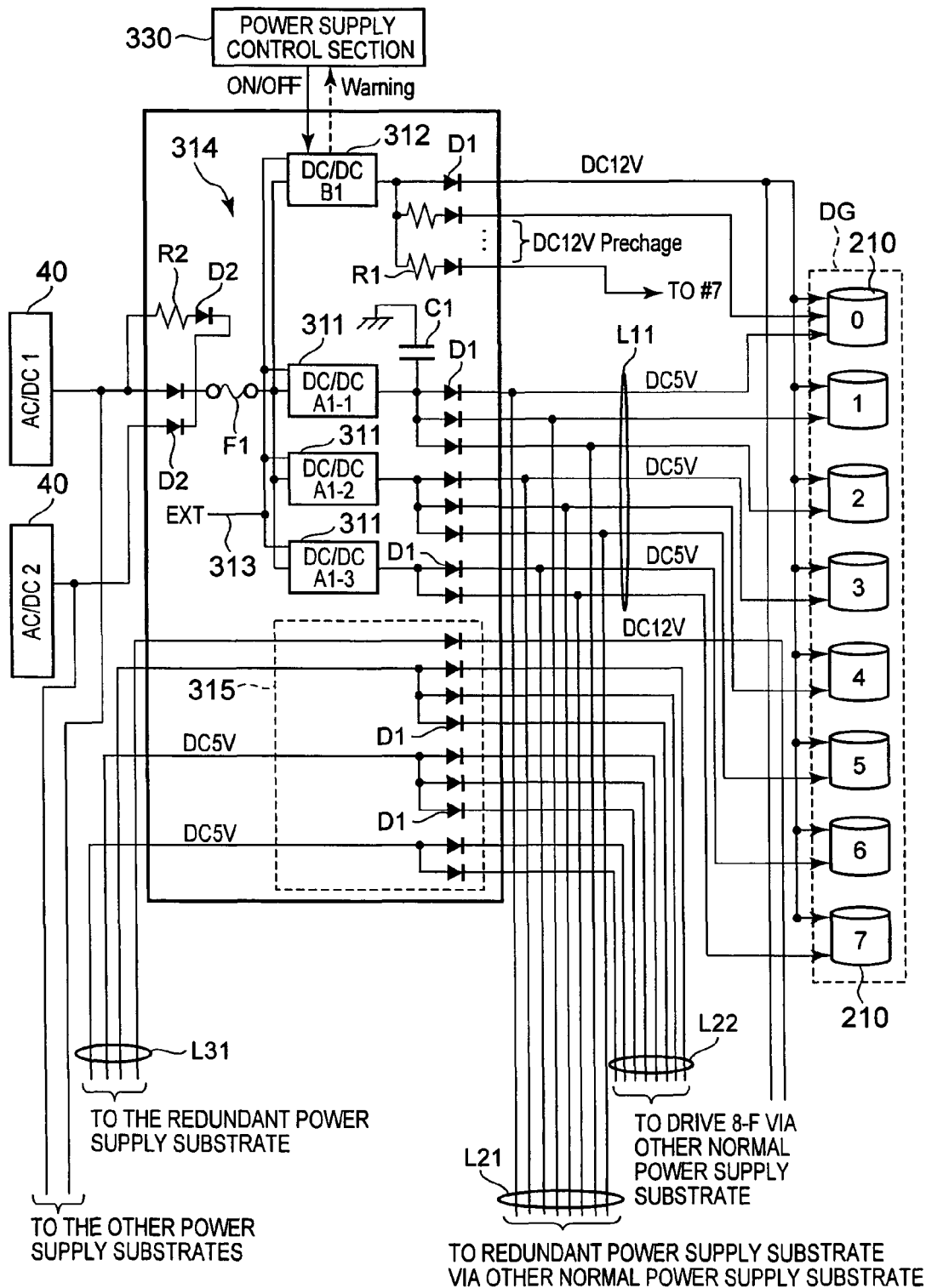
FIG. 7 is a circuit that shows an enlarged view of a normal power supply substrate.

The DC outputs (5 volts, for example) from the respective main DC/DC converters 311 (A1-1 to A1-3 and A2-1 to A2-3) are input to the respective disk drives 210 in the corresponding subgroups via a backflow prevention element such as a diode D1 (See FIG. 7).

The secondary DC/DC converters 311 (AN1 to AN3) correspond with all the subgroups respectively. That is, the respective secondary DC/DC converters 311 correspond with the respective subgroups of the disk drives 210 with the labels #0 to #2, disk drives 210 with the labels #3 to #5, disk drives 210 with the labels #6 and #7, disk drives 210 with the labels #8 to #A, disk drives 210 with the labels #B to #D, and the disk drives 210 with the labels #E and #F.

The respective secondary DC/DC converters 311 (AN1 to AN3) are connected in correspondence with any of the disk drives 210 on a one-for-one basis among the respective disk drives 210 constituting the respective subgroups. That is, the respective DC/DC converters 311 in the redundant power supply substrate 320 correspond with the disk drives 210 selected on a one-for-one basis from within the respective subgroups.

For example, as indicated by the solid lines L211 and L222 in FIG. 6, the secondary DC/DC converter 311 (AN1) is connected in correspondence with disk drive 210 with the label #0 in the subgroup comprising the disk drives 210 with the labels #0 to #2, disk drive 210 with the label #3 in the subgroup comprising the disk drives 210 with the labels #3 to #5, disk drive 210 with the label #6 in the subgroup comprising the disk drives 210 with the labels #6 and #7, disk drive 210 with the label #8 in the subgroup comprising the disk drives 210 with the labels #8 to #A, disk drive 210 with the label #B in the subgroup comprising the disk drives 210 with the labels #B to #D, and disk drive 210 with the label #E in the subgroup comprising the disk drives 210 with the labels #E and #F.

Likewise, as indicated by the dotted lines L212 and L222 in FIG. 6, the secondary DC/DC converter 311 (AN2) is connected in correspondence with disk drive 210 with the label #1 in the subgroup comprising the disk drives 210 with the labels #0 to #2, disk drive 210 with the label #4 in the subgroup comprising the disk drives 210 with the labels #3 to #5, disk drive 210 with the label #7 in the subgroup comprising the disk drives 210 with the labels #6 and #7, disk drive 210 with the label #9 in the subgroup comprising the disk drives 210 with the labels #8 to #A, disk drive 210 with the label #C in the subgroup comprising the disk drives 210 with the labels #B to #D, and disk drive 210 with the label #F in the subgroup comprising the disk drives 210 with the labels #E and #F.

Likewise, as indicated by the dotted lines L213 and L223 in FIG. 6, the secondary DC/DC converter 311 (AN3) is connected in correspondence with disk drive 210 with the label #2 in the subgroup comprising the disk drives 210 with the labels #0 to #2, disk drive 210 with the label #5 in the subgroup comprising the disk drives 210 with the labels #3 to #5, disk drive 210 with the label #A in the subgroup comprising the disk drives 210 with the labels #8 to #A, and disk drive 210 with the label #D in the subgroup comprising the disk drives 210 with the labels #B to #D.

When the disk drives 210 constituting the respective subgroups are ranked in order starting with the earliest numbers, the secondary DC/DC converter 311 (AN1) corresponds with the disk drives 210 in first position within the respective subgroups (#0, #3, #6, #8, #B, #E); the secondary DC/DC converter 311 (AN2) corresponds with the disk drives 210 in second position within the respective subgroups (#1, #4, #7, #9, #C, #F); and the secondary DC/DC converter 311 (AN3) corresponds with the disk drives 210 in third position within the respective subgroups (#2, #5, #A, #D).

As mentioned earlier, the pluralities of disk drives 210 constituting the drive groups DG are grouped in a plurality of subgroups and each connected to a plurality of DC/DC converters 311 (main DC/DC converter and secondary DC/DC converter).

In this embodiment, the structure for supplying DC power to the respective disk drives 210 is made redundant as described hereinabove. That is, DC power can be supplied to the respective disk drives 210 in the subgroups from two systems which are the main DC/DC converter 311 that corresponds with all the disk drives 210 in the subgroup and the secondary DC/DC converter 311 that corresponds with only one disk drive 210 in the subgroup.

Hence, even when there is a short-circuit, for example, in either one disk drive 210 in the subgroup, a power fault does not have an adverse effect on the other disk drive 210. This is because, when a short-circuit occurs in a one certain disk drive 210, the main DC/DC converter 311 that handles the subgroup to which the disk drive 210 belongs stops supplying DC power but DC power is supplied by the secondary DC/DC converter 311 to the other disk drive 210 in the subgroup.

This will be described by citing, by way of example, a case where a short-circuit occurs in the disk drive 210 with the label #1, for example. In this case, the protection circuit in the main DC/DC converter 311 (A1-1) operates and the main DC/DC converter 311 (A1-1) immediately stops the supply of DC power from the respective output terminals thereof. As a result, DC power is no longer supplied by the main DC/DC converter 311 (A1-1) to the respective disk drives 210 with the labels #0, #1, and #2.

Likewise, the secondary DC/DC converter 311 (AN2) connected to the disk drive 210 with the label #1 is also made to immediately stop the supply of DC power from the respective output terminals thereof as a result of the operation of the protection circuit. As a result, DC power is no longer supplied by the secondary DC/DC converter 311 (AN2) to the respective disk drives 210 with the labels #1, #4, #7, #9, #C, and #F.

Therefore, DC power is no longer supplied from either the main DC/DC converter 311 (A1-1) or the secondary DC/DC converter 311 (AN2) to the disk drive 210 with the label #1 in which the short-circuit was produced.

However, DC power is supplied from each of the other secondary DC/DC converters 311 (AN1, AN3) to the other disk drives 210 (#0, #2) in the subgroup in which the power fault occurred. Hence, within the subgroup in which the power fault occurred, only the disk drive 210 (#1) subject to the power fault stops functioning completely and the other disk drive 210 (#0, #2) continues to operate normally.

DC power is supplied from the main DC/DC converters 311 (A1-2, A1-3, A2-1, A2-2, A2-3) that handle the respective subgroups to the disk drives 210 (#1, #4, #7, #9, #C, #F) in the other subgroups associated with the stoppage of the secondary DC/DC converter 311 (AN2). Hence, the respective disk drives 210 (#1, #4, #7, #9, #C, #F) also continue to operate normally.

The power supply control section 330 controls the operation of the respective DC/DC converters 311 on the basis of instructions from the fault monitoring section 340.

Furthermore, the power supply control section 330 detects the states of the respective DC/DC converters 311 and reports the states to the fault monitoring section 340. The power supply control section 330 can be constituted as a hardware circuit, for example.

A constitution in which separate power supply control sections 330 correspond with the respective main DC/DC converters 311 (A1-1 to A1-3, A2-1 to A2-3) and the respective secondary DC/DC converters (AN1 to AN3) is possible or a constitution where all the DC/DC converters 311 are controlled by one power supply control section 330 is possible. If the constitution is such that separate power supply control sections 330 are made to correspond with the respective main DC/DC converters 311 (A1-1 to A1-3, A2-1 to A2-3) and the respective secondary DC/DC converters 311 (AN1 to AN3), the power supply control structure can be afforded redundancy.

The respective DC/DC converters 311 start or stop the operation to supply DC power in response to an instruction ('ON/OFF' in FIG. 6) from the power supply control section 330. Further, the respective DC/DC converters 311 output a signal indicating whether they are themselves operating normally ('Warning' in FIG. 6) to the power supply control section 330. A signal for controlling the operation of the respective DC/DC converters 311 is transmitted to the respective DC/DC converters 311 via a signal path L4. The signals indicating the states of the respective DC/DC converters 311 are transmitted to the power supply control section 330 via a signal path L5. The power supply control section 330 is able to detect whether a fault has occurred in the DC/DC converter 311 by checking the port to which a warning signal from the respective DC/DC converters 311 under the control of the power supply control section 330 is input.

Further, condensers C1 (See FIG. 7) are connected in parallel to the output of the respective DC/DC converters 311. In FIG. 7, a condenser C1 is shown only for DC/DC converter 311 (A1-1) for the sake of convenience. By connecting condensers C1 in parallel to the respective outputs of the DC/DC converters 311, the output current can be supplemented with surplus charge that has accumulated in the condenser C1. Hence, the maximum output value of the DC/DC converters 311 need not be set as the sum total of the maximum current values consumed by the respective disk drives 210. The DC/DC converters 311 need only have an output capacity that allows an effective current to be output. As a result, the output capacity of the DC/DC converter 311 can be made small. Further, the current supplied to the respective disk drives 210 is smoothed by the condensers C1.

FIG. 7 is a circuit diagram in which the focus is on one normal power supply substrate 310. The respective normal power supply substrates 310 and the redundant power supply substrate 320 each have the same circuit constitution. Therefore, one normal power supply substrate 310 is considered and shown in FIG. 7. A description that focuses on the constitution illustrated in FIG. 7 will now be provided. Due to space constraints on the page, numbers have been added to only some of the constituent elements.

The DC power that is output from the plurality of AC/DC power supply sections 40 is input to each of the DC/DC converters 311 and the DC/DC converter 312. The output from the first AC/DC power supply section 40 (1) is input to each of the DC/DC converters 311 and 312 via diode D2 and fuse F1 which are connected in series. This input path is called the 'first input path' here.

Furthermore, the output from the first AC/DC power supply section 40 (1) is input across the diode D2 and fuse µl of the first input path via a resistor R2 and the diode D2 that are connected in series. This input path is called the 'second input path'.

The output from the second AC/DC power supply section 40 (2) is input across the fuse µl and the diode D2 of the first input path via the diode D2. This input path is called the 'third input path'. The first input path and third input path are independent and, even in cases where a fault occurs in either input path, the DC power from the other input path can be supplied to the respective DC/DC converters 311 and 312.

As a result of the above circuit constitution, the outputs from the respective AC/DC power supply sections 40 are all distributed to the respective DC/DC converters 311 and 312 via the diode D2 and fuse µl. As a result of the fuse F1 being broken, the respective AC/DC power supply sections 40 and normal power supply substrate 310 are electrically cut and the circuit can be protected from an overcurrent.

Furthermore, in this embodiment, when the respective AC/DC power supply sections 40 and normal power supply substrate 310 are connected, the connections are made such that the circuit of the second input path is established before that of the first input path and third input path. For example, by changing the pin length of the connectors, it is possible to establish the second input path before the first and third input paths. As a result, the output from the first AC/DC power supply section 40 (1) is input to each of the DC/DC converters 311 and 312 via the second input path. That is, the second input path is a pre-charge path that suppresses the incoming current when the normal power supply substrate 310 is hot-inserted. As shown in FIG. 8, the first AC/DC power supply section 40 (1) and the second input path are connected by means of an odd-numbered normal power supply substrate 310 and the second AC/DC power supply section 40 (2) and second input path are connected by means of an even-numbered normal power supply substrate 310. That is, the pre-charge path is formed by alternately using the first AC/DC power supply section 40 (1) and second AC/DC power supply section 40 (2).

Further, although not illustrated, the normal power supply substrate 310 can comprise an intermittent outage prevention element such as a condenser, for example, so that normal operation can be continued even when the voltages that are input from the respective AC/DC power supply sections 40 have intermittently dropped.

The DC/DC converter 312 is a circuit for converting the DC power that is input from the AC/DC power supply sections 40 into DC 12V. The 12 V DC output of the DC/DC converter 312 is supplied to each of the disk drives 210 via diode D1. Further, the 12 V DC output of the DC/DC converter 312 is supplied to the respective disk drives 210 via a resistor R1 and diode D1 which are connected in series. The output via resistor R1 and diode D1 are pre-charge outputs. In FIG. 7, only the pre-charge output to the disk drive 210 (0) is shown for the sake of convenience but the 12 V DC pre-charge output is supplied to each of the disk drives 210. As a result, the incoming current when 12 V DC is supplied to the respective disk drives 210 is suppressed.

The DC/DC converter 312 is connected to the power supply control section 330 in the same way as the respective DC/DC converters 311. The DC/DC converter 312 starts the operation to supply the power supply or stops the power supply operation in response to instructions from the power supply control section 330. The DC/DC converter 312 is also able to report its own state (abnormal state) to the power supply control section 330.

The respective DC/DC converters 311 are circuits for converting the DC power that is input from the AC/DC power supply sections (40) into DC 5V. The outputs of the respective DC/DC converters 311 are split into two or three branches. The branch outputs are connected to a predetermined disk drive 210 via a backflow prevention diode D1. Although only shown for the DC/DC converter 311 (A1-1) for the sake of convenience, condensers Cl are connected in parallel with the outputs from the respective DC/DC converters 311.

The circuits constituted by the DC/DC converters 311 and 312 and so forth above constitute the output circuit 314. In addition to the output circuit 314, the normal power supply substrate 310 comprises a relay circuit 315.

The relay circuit 315 is a circuit for outputting power of DC 5V and DC 12V that are input from the redundant power supply substrate 320 via diode D1. As shown in FIG. 8, the respective normal power supply substrates 310 and redundant power supply substrate 320 basically comprise the same circuit. The outputs of the respective DC/DC converters 311 (AN1 to AN3) in the redundant power supply substrate 320 are input to the relay circuit 315 via the diode D1 of the redundant power supply substrate 320.

Therefore, the number of diodes D1 differ in the first path that is directly connected from the respective normal power supply substrates 310 to the respective disk drives 210 and in the second path that is OR-connected from the redundant power supply substrate 320 to the first path via the relay circuit 315. The number of diodes on the first path is '1' and the number of diodes D1 on the second path is '2'. There are a total of two, with the one diode D1 in the redundant power supply substrate 320 and the one diode D1 in the relay circuit 315.

Because the number of diodes D1 that exist on the path differs, normally, DC power (DC5V and DC12V) is supplied to the respective disk drives 210 from the normal power supply substrate 310, while the redundant power supply substrate 320 does not supply DC power. This is because, when viewed from the perspective of the disk drive 210s, the path with the smallest number of diodes D1 has a low impedance. That is, normally, the redundant power supply substrate 320 does not operate and is on standby. The redundant power supply substrate 320 outputs DC power when a fault occurs.

Further, as will be described subsequently in conjunction with FIG. 9, the voltage value output by the respective DC/DC converters 311 and 312 in the redundant power supply substrate 320 can be made lower than the voltage value output by the respective DC/DC converters 311 and 312 in the normal power supply substrate 310 by grounding the EXT terminal 313.

Thus, in this embodiment, the operating time of the redundant power supply substrate 320 can be made shorter than the operating time of the normal power supply substrate 310 and the lifespan of the redundant power supply substrate 320 can be made longer than the lifespan of the respective normal power supply substrates 310. As a result, the reliability of the redundant power supply substrate 320 can be increased. In particular, in this embodiment, on account of a constitution that supports a plurality (eight, for example) of normal power supply substrates 310 by means of one redundant power supply substrate 320, if a fault occurs in the redundant power supply substrate 320, the redundant constitution pertaining to the plurality of normal power supply substrates 310 then fails. However, as mentioned earlier, in this embodiment, because the operating time of the redundant power supply substrate 320 can be shortened as much as possible, the reliability can be maintained by lengthening the lifespan of the redundant power supply substrate 320.

FIG. 8 is a more detailed circuit diagram. As shown in FIG. 8, DC power is supplied to the respective disk drives 210 in a plurality of drive groups DG by a plurality of normal power supply substrates 310 and one redundant power supply substrate 320. Further, due to space constraints on the page, two normal power supply substrates 310 and one redundant power supply substrate 320 are shown in FIG. 8. However, in actuality, a redundant constitution pertaining to the supply of DC power can be obtained by providing one redundant power supply substrate 320 for eight normal power supply substrates 310. Further, the provision of eight normal power supply substrates 310 is an example and the present invention is not limited thereto. A smaller number than eight normal power supply substrates 310 or a greater number than eight thereof can also be supported by one redundant power supply substrate 320. As the number of normal power supply substrates 310 supported by one redundant power supply substrate 320 increases, the number of DC/DC converters 311 required for one disk drive 210 drops and the fabrication costs of the power supply device 300 are reduced.

FIG. 9 is a graph showing the relationship between the voltage value output by the redundant power supply substrate 320 and the voltage value output by the normal power supply substrate 310. Now, let us return to FIG. 7. As shown in FIG. 7, EXT terminals 313 are provided for each of the DC/DC converters 311 and 312. The EXT terminals 313 are used to reduce the value of the output voltages. The DC/DC converters 311 and 312 are constituted beforehand so that, when the EXT terminals 313 are grounded, value V2 of the output voltage of the DC/DC converters 311 and 312 is reduced by ΔV1 from the normal output voltage value V1. Further, although this is shown without distinguishing DC 12V and DC 5V in FIG. 9, in the case of either DC 12V or DC 5V, the output voltage is reduced when the EXT terminal 313 is grounded.

As shown in FIG. 8, the EXT terminal 313 is grounded within the redundant power supply substrate 320 and the EXT terminals 313 are not grounded within the normal power supply substrates 310. Hence, only the values of the voltages output by the respective DC/DC converters 311 and 312 in the redundant power supply substrate 320 drop.

Hence, in this embodiment, in addition to (1) a constitution in which the number of diodes on the path that are serially input from the normal power supply substrate 310 to the disk drive 210 and the number of diodes input to the disk drives 210 via the relay circuit 315 from the redundant power supply substrate 320 is changed, (2) the values of the voltage output by the redundant power supply substrate 320 is also reduced. Accordingly, it is possible to reduce the possibility that the redundant power supply substrate 320 will normally be used as much as possible to extend the lifespan of the redundant power supply substrate 320, whereby the reliability of the power supply device 300 can be increased.

FIG. 10 is an explanatory diagram showing an example of the table T1 for managing the respective disk drives 210. This table T1 is stored in the shared memory 140, for example. The respective DKA 120 and SVP 160 are able to reference the drive management table T1.

The drive management table T1 associates and manages the items driver group number I11, subgroup number I12, and drive number I13, for example. In addition, the table T1 may also comprise items for managing the RAID group.

The drive group number I11 is information for identifying each of the drive groups DG. The subgroup number I12 is information for identifying the subgroups in the respective drive groups. The drive number I13 is information for specifying the disk drives 210 contained in the respective subgroups.

By using the drive management table T1 which is constituted thus, it is possible to grasp which drive group DG and subgroup SG the disk drives 210 belong to and so forth. Items other than those listed above may also be contained in Table T1. For example, it is also possible to include items such as the type of disk drive 210 (FC disk or ATA disk or the like), the RAID level of the RAID group 212, and the operating state of the disk drive 210 in Table T1.

FIG. 11 is an explanatory diagram that shows an example of a table T2 for managing the respective DC/DC converters 311 in the respective normal power supply substrates 310. That is, Table T2 is a table for managing the main DC/DC converters. This Table T2 is stored in the shared memory 140, for example. Table T2 associates and manages, for example, a DC/DC converter number I21, an output terminal number I22, and a drive number 123.

The DC/DC converter number I21 is information for identifying the respective main DC/DC converters 311. The terminal number I22 is information for identifying the respective output terminals provided in the main DC/DC converters 311. The drive number I23 is information for identifying the respective disk drives 210.

By using the main DC/DC converter management table T2 that is constituted in this way, it is possible to grasp which disk drives 210 the respective main DC/DC converters 311 are connected to.

FIG. 12 is an explanatory diagram that shows an example of table T3 for managing the respective DC/DC converters 311 in the redundant power supply substrate 320. That is, Table T3 is a table for managing the secondary DC/DC converters 311. Table T3 is also stored in the shared memory 140, for example. Like Table T2 above, Table T3 associates and manages, for example, a DC/DC converter number I31, a terminal number I32, and a drive number I34. In addition, Table T3 associates and manages a relay substrate number I33 with each of the items I31 to I33. The relay substrate number I33 is the number of the normal power supply substrate 310 with a relay circuit 315 that exists between the output terminal of the redundant power supply substrate 320 and the connection-destination disk drive 210. That is, the relay substrate number is identification information for specifying the whereabouts of the relay circuit 315 to which each of the output terminals of the redundant power supply substrate 320 are connected.

Figure 13:
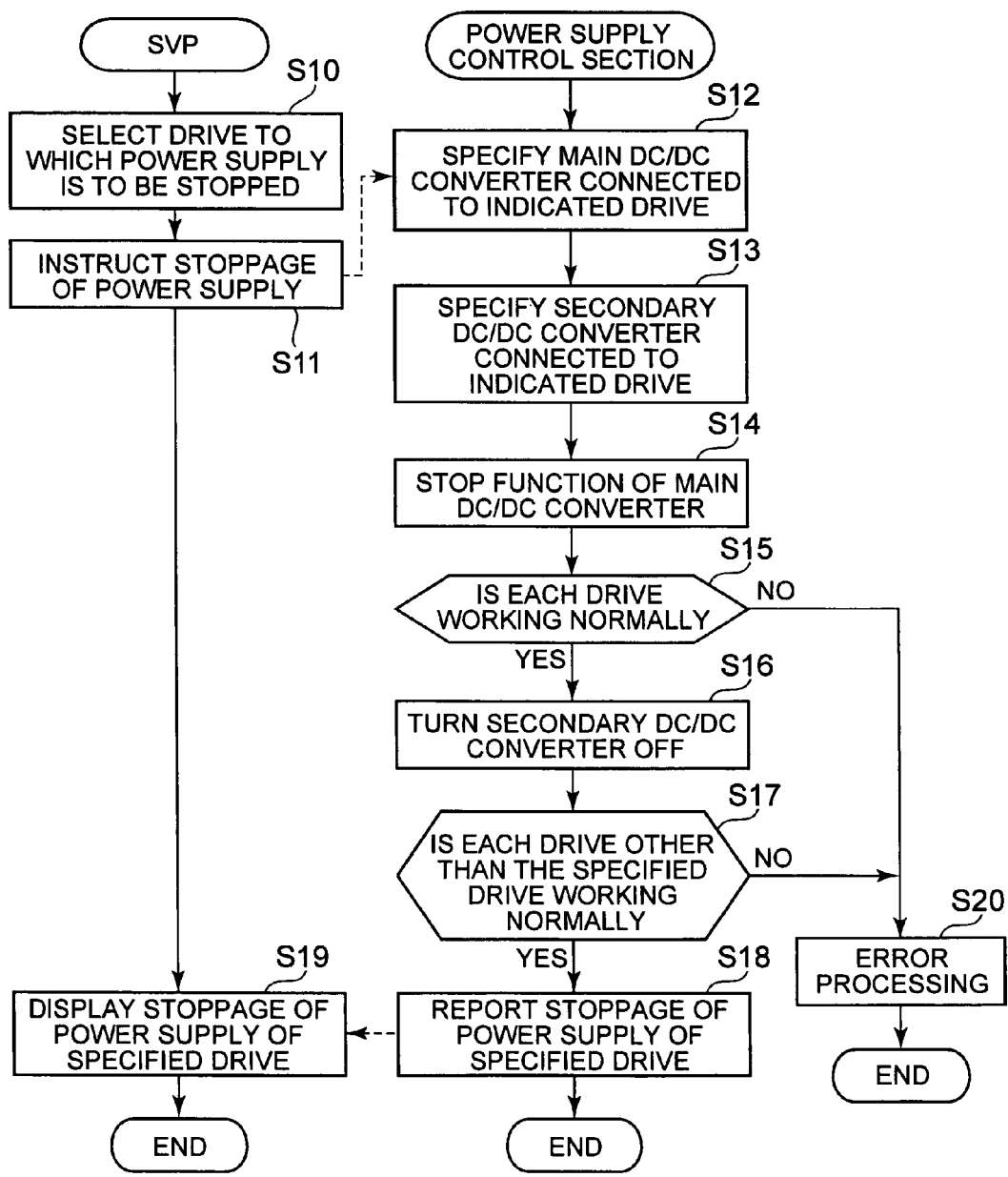
FIG. 13 is a flowchart showing the processing in a case where the power supply to the disk drives is stopped in disk drive units.

FIG. 13 is a flowchart showing the processing in a case where the supply of DC power to each of the disk drives 210 is stopped individually. Each of the following flowcharts described hereinbelow show an overview of the processing and sometimes differ from the actual programs. Further, if necessary, sometimes the steps can be switched or eliminated and other steps can be added. The steps in FIG. 13 are abbreviated as 'S'.

Further, in the following description, the power supply control section 330 is described as the main constituent but a constitution in which the DKA 120 and fault monitoring section 340 perform the power control mentioned below is also possible.

The user selects a disk drive 210 to which the supply of power has been stopped by using the management terminal 14 and SVP 160 (S10). The SVP 160 instructs the power supply control section 330 to stop the supply of DC power to the selected disk drive 210 (S11). The stoppage instruction is reported to the power supply control section 330 that handles the selected disk drive 210 via the fault monitoring section 340.

Upon receipt of the stoppage instruction, the power supply control section 330 specifies the main DC/DC converter 311 that is connected to the selected disk drive 210 (S12). In addition, the power supply control section 330 specifies a secondary DC/DC converter 311 that is connected to the selected disk drive 210 (S13).

The power supply control section 330 stops the DC power output from the main DC/DC converter 311 specified in S12 (S14). The power supply control section 330 judges whether the respective disk drives 210 are working normally after the output of DC power from the main DC/DC converter 311 has been stopped (S15).

In cases where it is judged that the respective disk drives 210 are working normally (S15:YES), the power supply control section 330 then turns OFF the secondary DC/DC converter 311 specified in S13 (S16). A constitution in which the main DC/DC converter 311 and secondary DC/DC converter 311 are turned off at the same time is also possible.

The power supply control section 330 judges whether DC power is being supplied to disk drives 210 other than the disk drive 210 indicated by the SVP 160 (S17). Only when the indicated disk drive 210 is stopped and the respective other disk drives 210 are operational (S17:YES), the power supply control section 330 issues, via the fault monitoring section 340, a report to the SVP 160 to the effect that the supply of power to the indicated disk drive 210 has been stopped (S18).

The SVP 160 issues a report to the management terminal 14 to the effect that the fact that the supply of power to the disk drive 210 indicated by the management terminal 14 has stopped (Sl9). The fact that the supply of power to the disk drive 210 indicated by the user has stopped is displayed on the screen of the management terminal 14. As a result, the user is able to remove the desired disk drive 210 from the HDD box 20. The user then mounts a new disk drive 210 in the HDD box 20.

Figure 14:
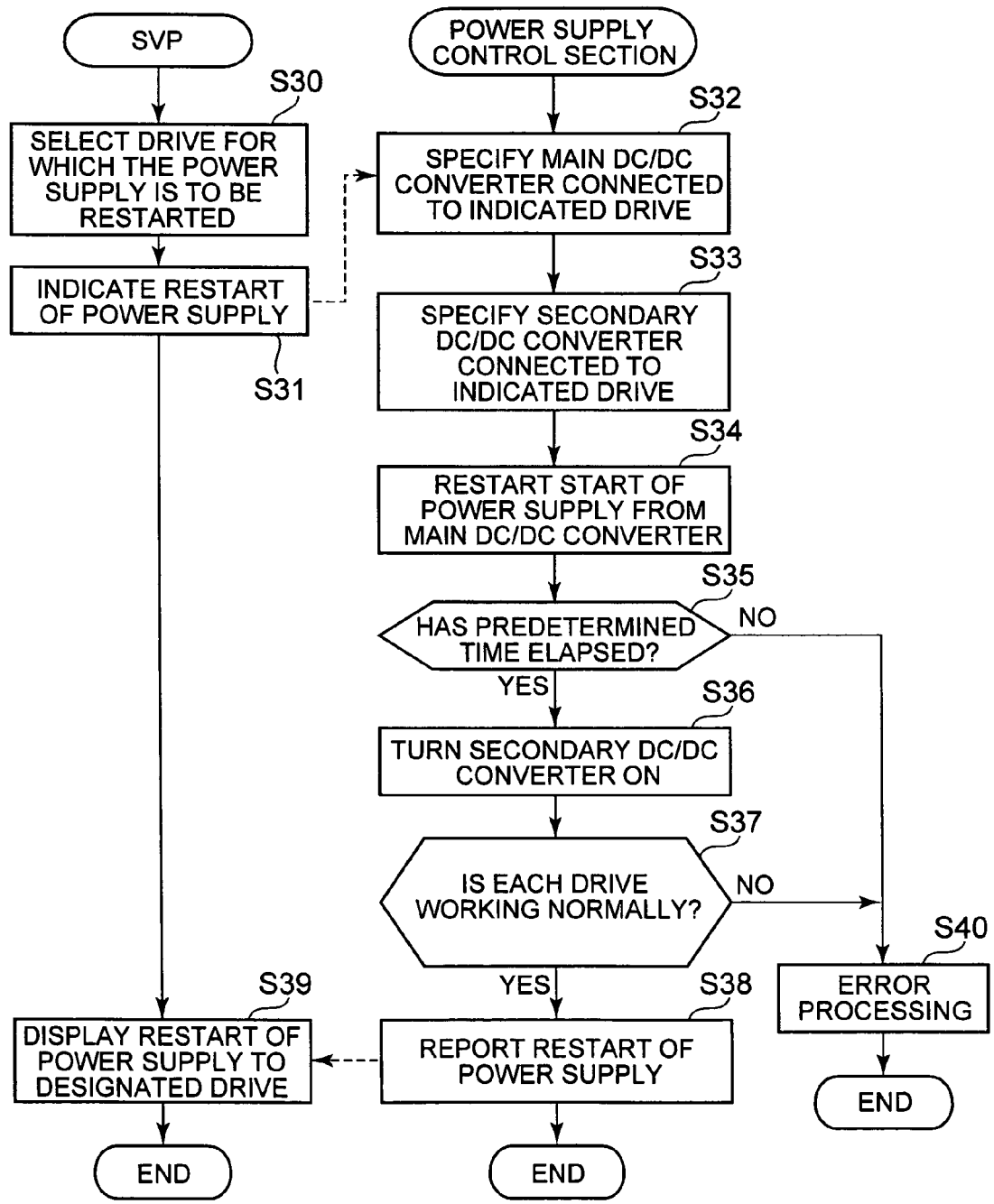
FIG. 14 is a flowchart showing the processing in a case where the power supply to the disk drives is started in disk drive units.

FIG. 14 is a flowchart showing the processing in a case where the supply of DC power to each of the disk drives 210 is individually started. The user uses the management terminal 14 and SVP 160 to select the number of the disk drive 210 to which the supply of DC power is started (S30). The SVP 160 instructs the power supply control section 330 to start the supply of power to the disk drive 210 selected by the user (S31).

The power supply control section 330 specifies the main DC/DC converter 311 and secondary DC/DC converter 311 connected to the disk drive 210 indicated by the SVP 160 (S32, S33).

The power supply control section 330 first re-starts the supply of DC power from the main DC/DC converter 311 specified in S32 (S33). After waiting until a predetermined time has elapsed (S34), the power supply control section 330 re-starts the supply of DC power from the secondary DC/DC converter 311 specified in S33 (S35).

Here, a predetermined time is a time that is determined beforehand by the user or at the time of shipping or the like. The predetermined time can be set as the time from when the DC power is transmitted to the disk drive 210 until the operation is stable, for example. That is, even when DC power is supplied to the new disk drive 210, a little time is needed until the new disk drive 210 assumes a useable state. Therefore, the power supply control section 330 waits in S35 until the time required until startup of the disk drive 210 has elapsed.

When the predetermined time has elapsed (S35: YES), the power supply control section 330 turns ON the secondary DC/DC converter 311 specified in S33 (S36). As mentioned earlier, the secondary DC/DC converter 311 has a lower output voltage value and a larger number of diodes D1 on the path thereto. Hence, DC power is not supplied from the secondary DC/DC converter 311 to the disk drive 210. Further, the power supply control section 330 confirms whether the respective disk drives 210 are working normally (S37).

After confirming that the respective disk drives 210 are operating normally (S37: YES), the power supply control section 330 issues a report via the fault monitoring section 340 to the SVP 160 to the effect that the supply of power to the disk drive 210 indicated by the SVP 160 has started (S38).

The SVP 160 reports the fact that the supply of power to the disk drive 210 indicated by the management terminal 14 has started to the management terminal 14 (S39). As a result, the fact that the supply of power to the disk drive 210 selected by the user has stopped normally is displayed on the screen of the management terminal 14.

Thus, in this embodiment, control can be exercised so that the supply of power is turned ON and OFF individually for each of the disk drives 210. Hence, when a specified disk drive 210 is exchanged as a result of maintenance work or the like, for example, the user is able to remove the specified disk drive 210 from the enclosure after stopping the supply of power to the specified disk drive 210. Further, after the user has exchanged the disk drive 210 for a new disk drive 210, the supply of power to the new disk drive 210 can be re-started.

Therefore, in this embodiment, an electrical circuit for a so-called hot swap in which a disk drive 210 is removed or mounted while power is still being supplied need not be provided in each disk drive 210. As a result, the circuit structure of the disk drive 210 can be simplified and the fabrication costs of the disk drive 210 can be reduced.

Figure 15:
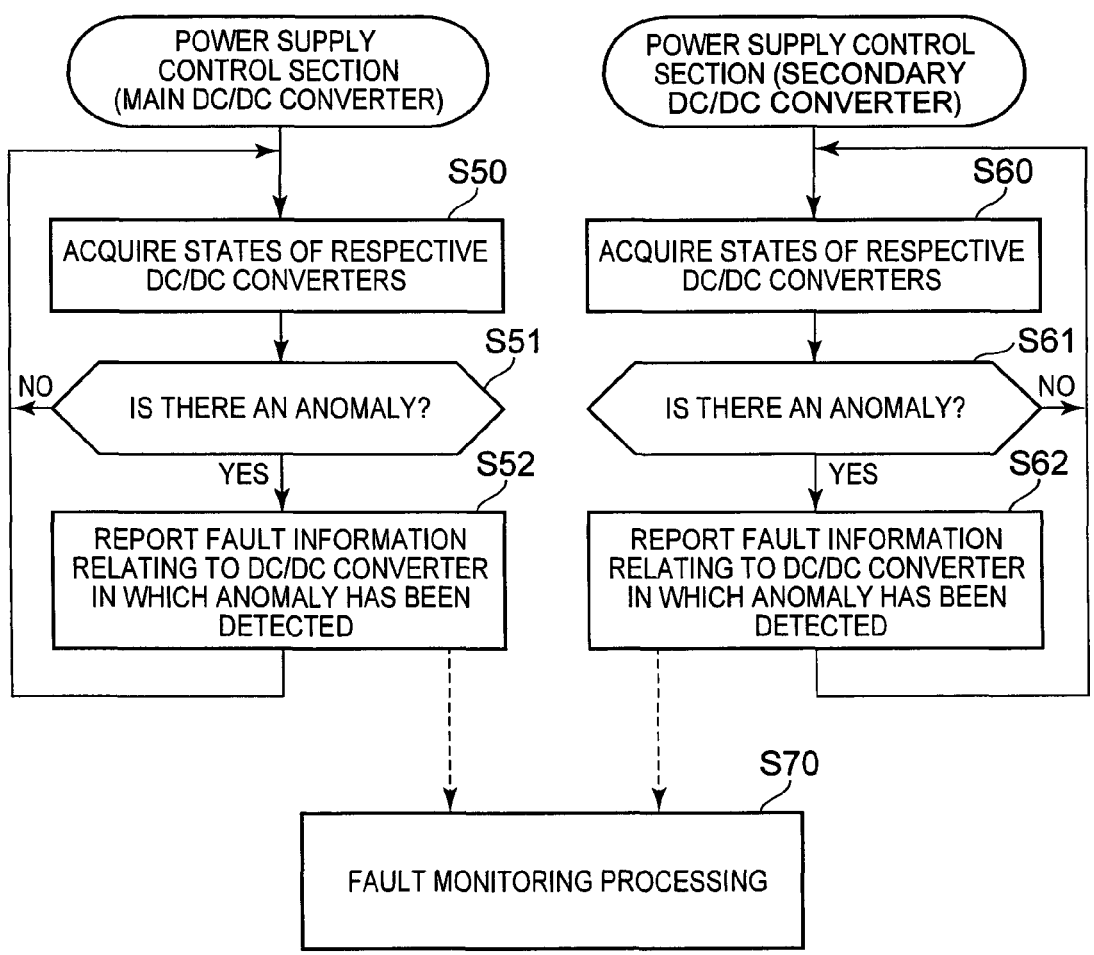
FIG. 15 is a flowchart showing the processing according to which the power supply control section monitors the states of the respective DC/DC converters.

FIG. 15 is a flowchart showing the monitoring processing of the DC/DC converters 311 which is performed by the power supply control section 330. The power supply control section 330 confirms the signal levels of the warning signals from the respective DC/DC converters 311 and acquires the states of the respective main DC/DC converters 311 (S50).

The power supply control section 330 judges whether an anomaly has occurred in any of the respective DC/DC converters 311 (S51). When a warning signal has been input from any one or more of the main DC/DC converters 311 (S51: YES), the power supply control section 330 reports the fault information relating to the main DC/DC converter 311 in which the anomaly has been detected to the fault monitoring section 340 (S52). The fault information relating to the main DC/DC converter can include, for example, the DC/DC converter number for specifying the main DC/DC converter 311 in which the anomaly occurred, the time at which the anomaly has been detected, and the type of anomaly and so forth.

Further, a power supply control section 330 which is the same as or different from the power supply control section 330 that executes steps S50 to S52 confirms the warning signal from the respective secondary DC/DC converters 311 (S60) and, in cases where an anomaly is detected in any secondary DC/DC converter 311 (S61:YES), reports the fault information to the fault monitoring section 340 (S62). The fault monitoring section 340 executes fault monitoring processing (S70) which will be described subsequently in conjunction with FIG. 15 on the basis of the report from the power supply control section 330.

Figure 16:
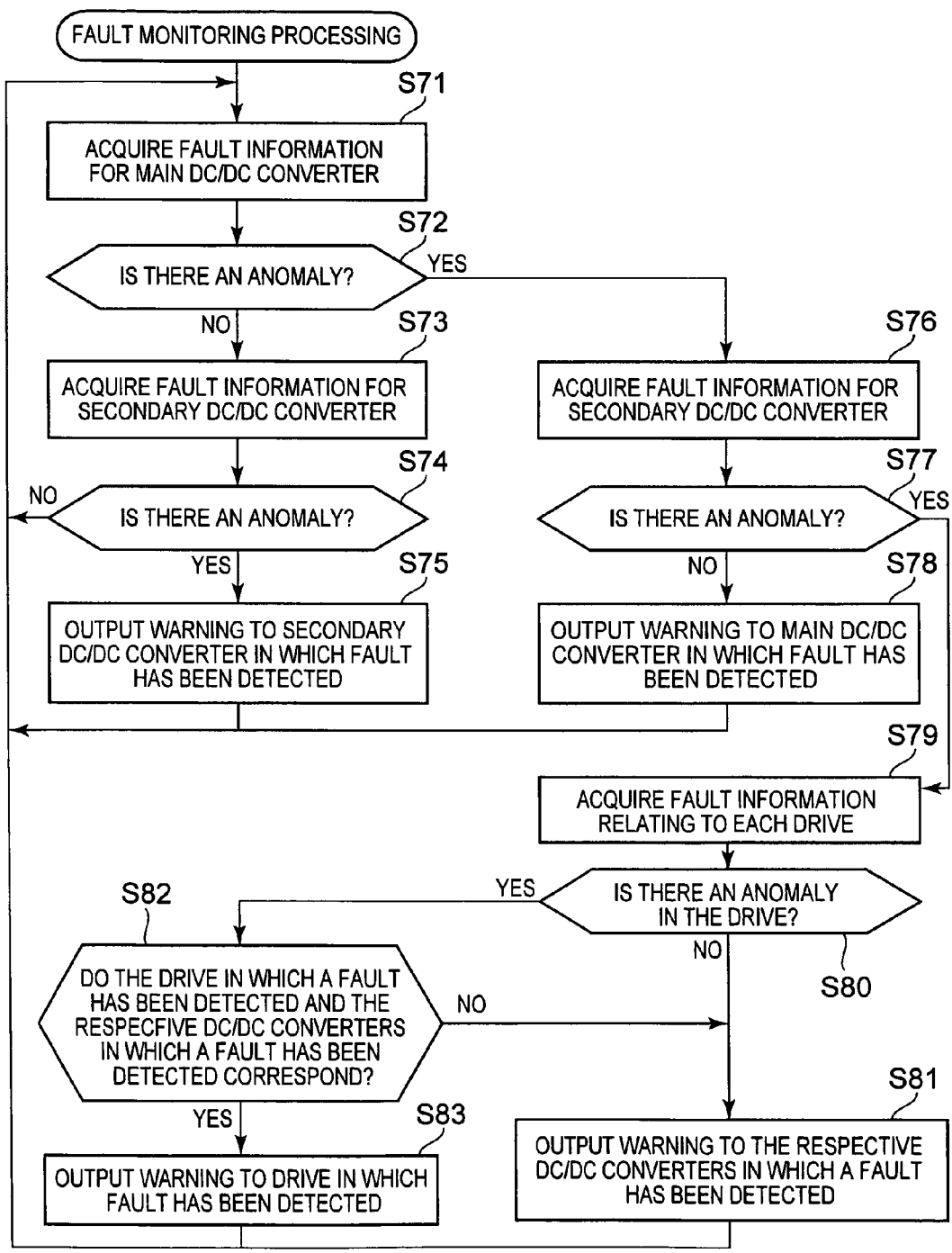
FIG. 16 is a flowchart showing fault monitoring processing.

FIG. 16 is a flowchart of the fault monitoring processing indicated by S70 in FIG. 15. The fault monitoring processing is executed by the fault monitoring section 340. Instead, the constitution may also be such that the DKA 120 executes the fault monitoring processing, for example.

The fault monitoring section 340 acquires fault information relating to the main DC/DC converter 311 (S71) and judges whether an anomaly has occurred (S72). When an anomaly has not occurred in the respective main DC/DC converters 311 (S72: NO), the fault monitoring section 340 acquires fault information relating to the secondary DC/DC converter 311 (S73).

When an anomaly has not occurred in the second DC/DC converter 311 (S74: NO), the processing returns to S71, whereupon monitoring is repeated. When it is judged that a fault (anomaly) has occurred in any of the respective secondary DC/DC converters 311 (S74: YES), the fault monitoring section 340 outputs a warning signal to the secondary DC/DC converter 311 in which a fault has been detected (S75).

The SVP 160 is able to transmit a warning message to the management terminal 14 on the basis of the warning signal. The management terminal 14 is able to warn the management server 15 on the basis of the warning message received from the SVP 160. The management server 15 is able to report the fault with the storage control device 10 to maintenance personnel or the user by using communication means such as electronic mail or a telephone, for example, on the basis of the warning received from the management terminal 14.

On the other hand, when it is judged that a fault has occurred in any of the main DC/DC converters 311 (S72: YES), the fault monitoring section 340 acquires fault information relating to the respective secondary DC/DC converters 311 (S76). The fault monitoring section 340 judges whether a fault has occurred in the respective secondary DC/DC converters 311 (S77).

When an anomalous state is detected in any of the respective main DC/DC converters 311 (S77: YES), the fault monitoring section 340 outputs a warning signal relating to the main DC/DC converter 311 in which the anomaly has been detected (S78).

A case where 'YES' is judged in S77 is a case where the occurrence of a fault has been detected in both the main DC/DC converter 311 and the secondary DC/DC converter 311. Therefore, the fault monitoring section 340 acquires the fault information relating to the respective disk drives 210 (S79) and judges whether an anomaly has occurred in any of the disk drives 210 (S80). The fault monitoring section 340 is able to detect the existence of an anomaly in the disk drives 210 on the basis of the states of communication and so forth between the respective disk drives 210 and an interface circuit, for example.

When an anomaly is recognized in any of the respective disk drives 210 (S80: YES), the fault monitoring section 340 judges whether there is correspondence between the disk drive 210 in which the anomaly has been detected in S80 and the main DC/DC converter 311 and the secondary DC/DC converter 311 in which an anomaly has been detected in S72 and S77 (S82). That is, the fault monitoring section 340 confirms whether an anomaly has been detected in the main DC/DC converter 311 and secondary DC/DC converter 311 which are each connected to the disk drive 210 in which the anomaly has been detected.

In cases where it is judged that an anomalous state has arisen in the main DC/DC converter 311 and secondary DC/DC converter 311 which are connected to the disk drive 210 in which an anomaly has been detected (S82: YES), the fault monitoring section 340 outputs a warning to the disk drive 210 in which the anomalous state has been detected in S80 (S83).

In cases where there is correspondence between the disk drive 210 in which the anomaly has been detected and the main DC/DC converter 311 and secondary DC/DC converter 311 in which the anomaly has been detected (S80: NO), the fault monitoring section 340 outputs a warning for the main DC/DC converter 311 and secondary. DC/DC converter 311 in which the anomaly has been detected in S72 and S77 (S81).

For example, in a case where an anomaly of some kind such as a response delay is observed in the data inputs and outputs to and from the disk drive 210 and where an anomaly is detected in both the respective DC/DC converters 311 connected to the disk drives 210, it may be considered that a power fault has occurred in the disk drive 210. This is because, as mentioned earlier, in cases where a power fault such as a short circuit has occurred within the disk drive 210, the protection circuits of the main DC/DC converter 311 and secondary DC/DC converter 311 that are connected to the disk drive 210 operate to stop the operation of the main and secondary DC/DC converters 311.

Thus, in this embodiment, it is possible to specify a disk drive 210 for which there is a high probability that a power fault has occurred on the basis of the existence of an anomaly in the main and secondary DC/DC converters 311 and the respective disk drives 210. Therefore, the user is able to easily specify the cause of the fault and the location in which the fault occurred, whereby the operability of the maintenance work and so forth can be improved.

The power supply device 300 of the storage control device 10 of this embodiment has the above constitution. Therefore, as mentioned earlier, it is possible to increase the reliability by rendering the structure for supplying power to the respective disk drives 210 redundant, the fabrication costs of the disk drives 210 and power supply device 300 can be reduced, and the productivity can be improved.

Furthermore, in this embodiment, the constitution is such that one redundant power supply substrate 320 is provided for a plurality of normal power supply substrates 310 to render the power supply structure redundant. Hence, the number of DC/DC converters 311 and 312 for implementing a redundant constitution can be reduced further and the fabrication costs of the power supply device 300 can be reduced.

In addition, this embodiment is constituted such that the redundant power supply substrate 320 is made to operate only in cases where an anomaly has occurred in the normal power supply substrate 310 by changing the number of diodes and the values of the output voltages. Hence, the operating time of the redundant power supply substrate 320 is shortened, whereby the lifespan thereof can be extended and the reliability of the power supply-related redundant constitution can be improved.

Further, this embodiment is constituted such that the start and stoppage of the power supply can be controlled individually for each of the disk drives 210 by means of a redundant power supply structure. Therefore, a target disk drive 210 can be removed after stopping the supply of DC power to the target disk drive 210. It is also possible to supply DC power after mounting the removed disk drive 210 or a new disk drive 210. Hence, the workability of a case where the settings of a single disk drive 210 are changed or a case where the disk drive 210 is exchanged for a new disk drive 210, for example, improves. This is because the power supply of only the target disk drive 210 can be individually controlled and there is no effect at all on the supply of power to the other disk drives 210. Further, because the power supply can be individually controlled, there is also no need to include a mechanism to enable a hot swap in the disk drive 210. Therefore, the disk drive 210 of this embodiment does not contain an electrical circuit for a hot swap or a DC/DC converter; hence, the constitution is simpler than that of conventional disk drives and the fabrication costs and so forth can be reduced.

Second Embodiment

The second embodiment of the present invention will now be described on the basis of FIGS. 17 to 19. Each of the following respective embodiments including this embodiment correspond to the modified example of the first embodiment.

Figure 17:
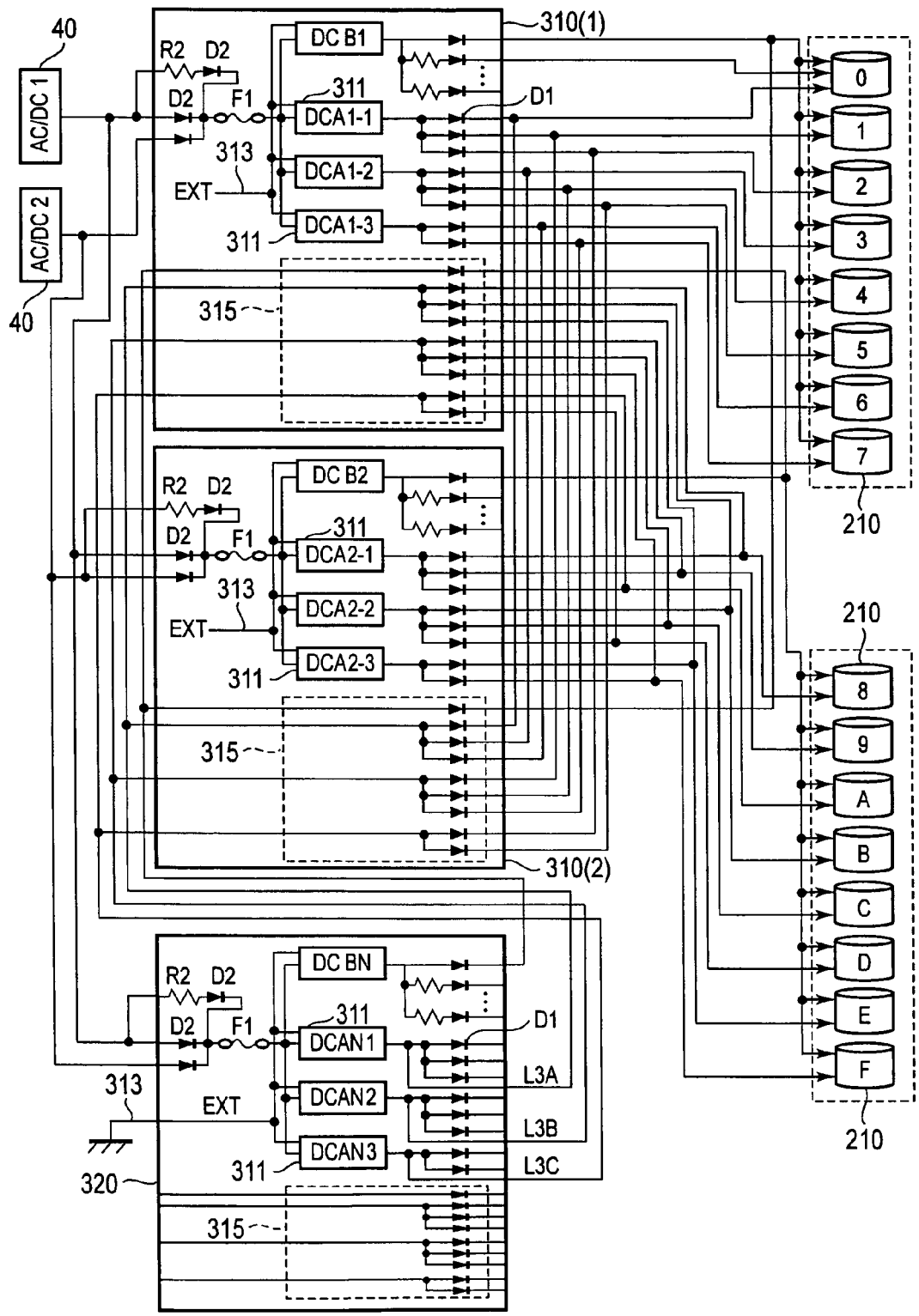
FIG. 17 is a circuit diagram showing the power supply structure according to the second embodiment of the present invention.

FIG. 17 is a circuit diagram showing the power supply structure of this embodiment. In this embodiment, the number of diodes D1 that exist on the path from the normal power supply substrate 310 to the disk drive 210 and the number of diodes D1 that exists on the path that extends from the redundant power supply substrate 320 to the disk drive 210 via the relay circuit 315 are equal; only the value of the output voltage of the redundant power supply substrate 320 is reduced.

Figure 18:
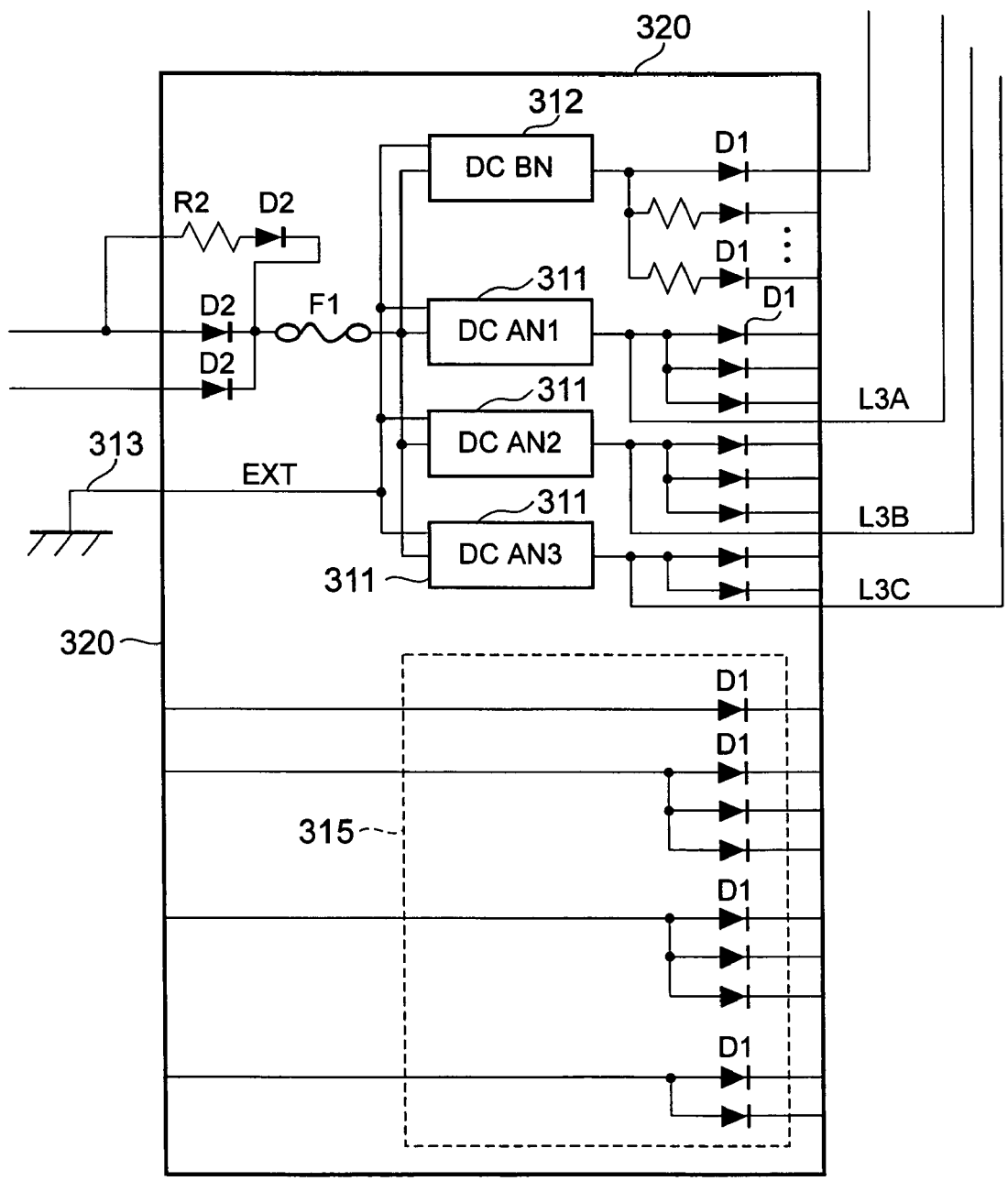
FIG. 18 is a circuit diagram showing an enlargement of the redundant power supply substrate in FIG. 17.

FIG. 18 is a circuit that focuses on the redundant power supply substrate 320 in FIG. 17. As shown in FIGS. 17 and 18, the paths L3A, L3B, and L3C that connect the respective DC/DC converter 311 and the relay circuit 315 in the redundant power supply substrate 320 are provided with the diode D1 in the redundant power supply substrate 320 serving as a bypass.

That is, one end of the respective paths L3A to L3C that constitute a part of the 'second path' is connected between the output terminals of the respective DC/DC converters 311 and the diodes D1 in the redundant power supply substrate 320, while the other end is connected to the input terminal of the relay circuit 315.

Figure 19:
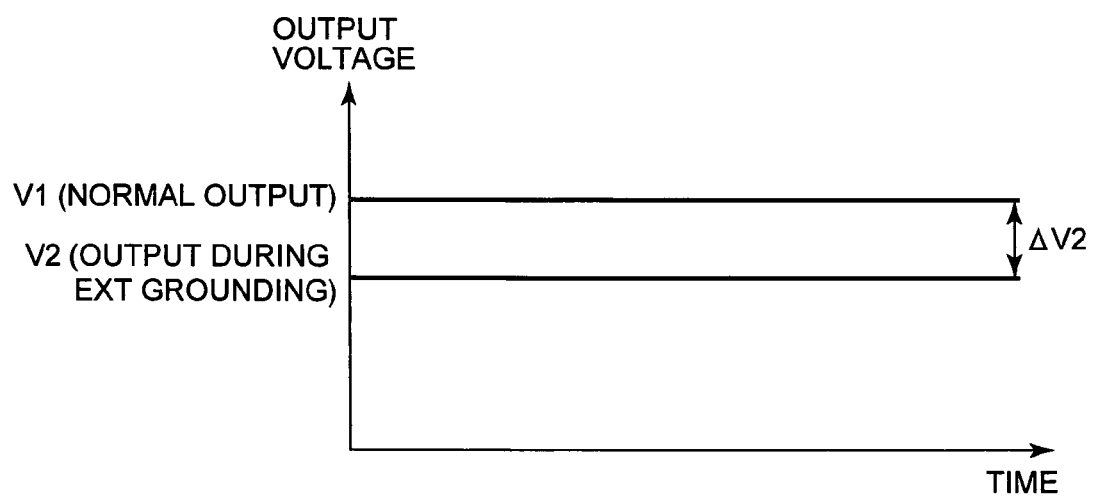
FIG. 19 is a graph showing the relationship between the value of the voltage output by the redundant power supply substrate and the value of the voltage output by the normal power supply substrate.

FIG. 19 is a graph showing the output voltages of the respective DC/DC converters 311 (that is, the secondary DC/DC converters 311) in the redundant power supply substrate 320. In this embodiment, as a result of grounding the EXT terminal 313, the value V2A of the voltage output by the respective DC/DC converters 311 drops below that of the case shown in FIG. 9 (V2A<V2, ΔV2>ΔV1).

An embodiment which is constituted in this way exhibits the same effect as that of the first embodiment. In addition, in this embodiment, the number of diodes on the path that extends from the respective secondary DC/DC converters 311 to the respective disk drives 210 via the relay circuit 315 can be made smaller than that of the first embodiment. Hence, in this embodiment, even in a case where there is inconsistency in the characteristics of the diodes D1, the probability of DC power being output by the redundant power supply substrate 320 can be reduced and the operation of the redundant power supply substrate 320 can be stabilized further to improve the reliability of the power supply device 300.

Third Embodiment

Figure 20:
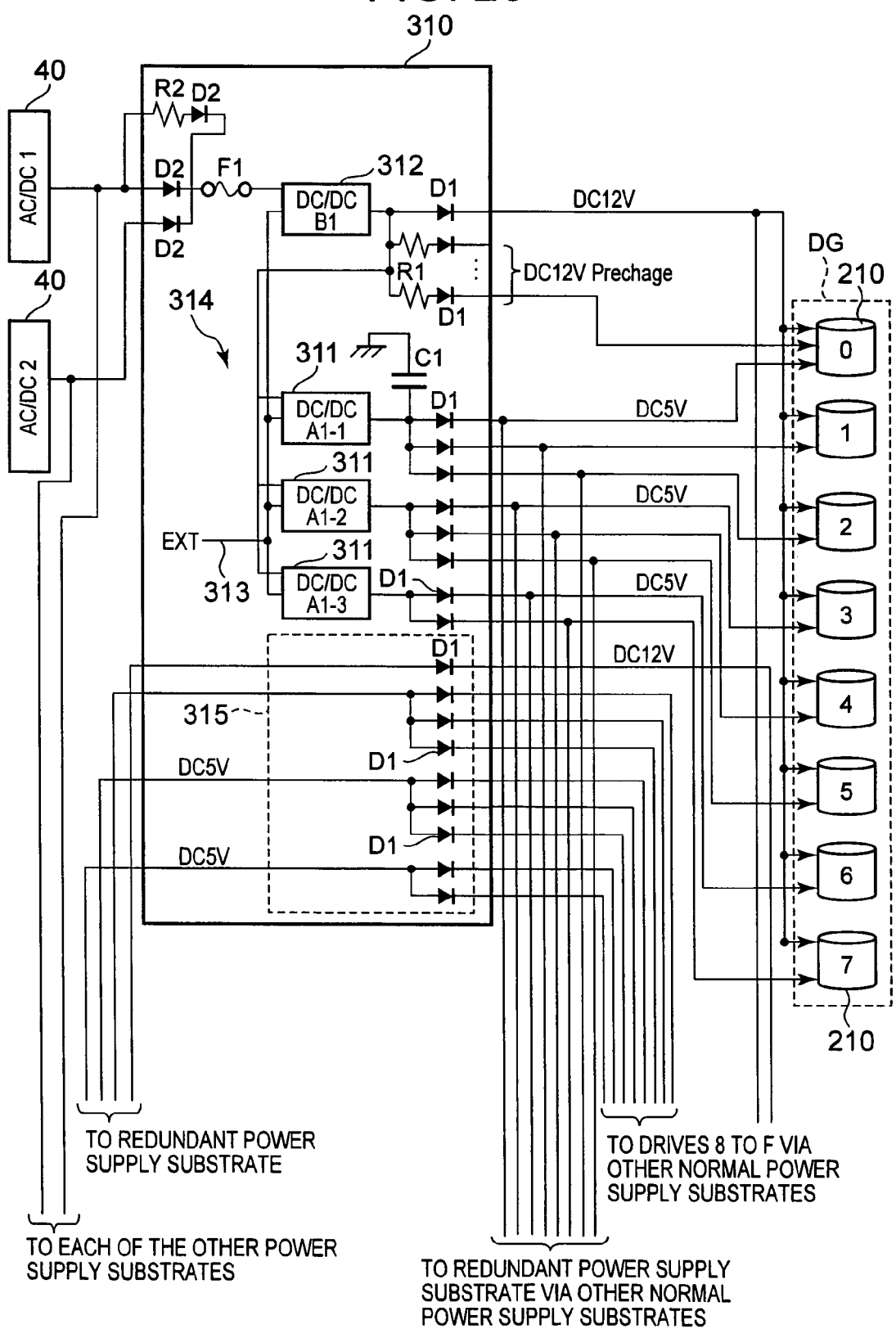
FIG. 20 is a circuit showing an enlargement of the power supply substrate of the power supply device according to a third embodiment of the present invention.

The third embodiment will now be described on the basis of FIGS. 20 and 21. In this embodiment, the output of the DC/DC converter 312 for supplying DC 12V to the respective disk drive 210 is used as the input of the DC/DC converter 311 for supplying DC 5V to the respective disk drives 210.

In each of the aforementioned embodiments, the respective DC/DC converters 311 convert the DC power input from the AC/DC power supply section 40 into DC 5V and output DC 5V power. In contrast, in this embodiment, the output from the DC/DC converter 312 is input to the respective DC/DC converters 311. The respective DC/DC converters 311 convert DC 12V input from the DC/DC converter 312 into DC 5V and output DC 5V power.

Therefore, in this embodiment, the respective AC/DC power supply sections 40 are connected to only the DC/DC converter 312. The constitution of the connection between the respective AC/DC power supply sections 40 and the DC/DC converter 312 is substantially the same as that of the first embodiment and a description thereof will be omitted here.

In this embodiment, the DC/DC converter 312 does not output a warning signal to the power supply control section 330. Hence, the signal circuit for outputting the warning signal from the DC/DC converter 312 to the power supply control section 330 is not provided in this embodiment.

The DC/DC converter 312 is a large source converter that supplies DC power to the respective DC/DC converters 311. In other words, the DC/DC converter 312 can be called an in-substrate power supply device. When a fault occurs in the DC/DC converter 312 and same stops, the respective DC/DC converters 311 to which DC power is supplied from the DC/DC converter 312 also stop. Therefore, all of the respective DC/DC converters 311 stop outputting a DC power output, it can be assumed that an anomaly has occurred in the DC/DC converter 312.

Figure 21:
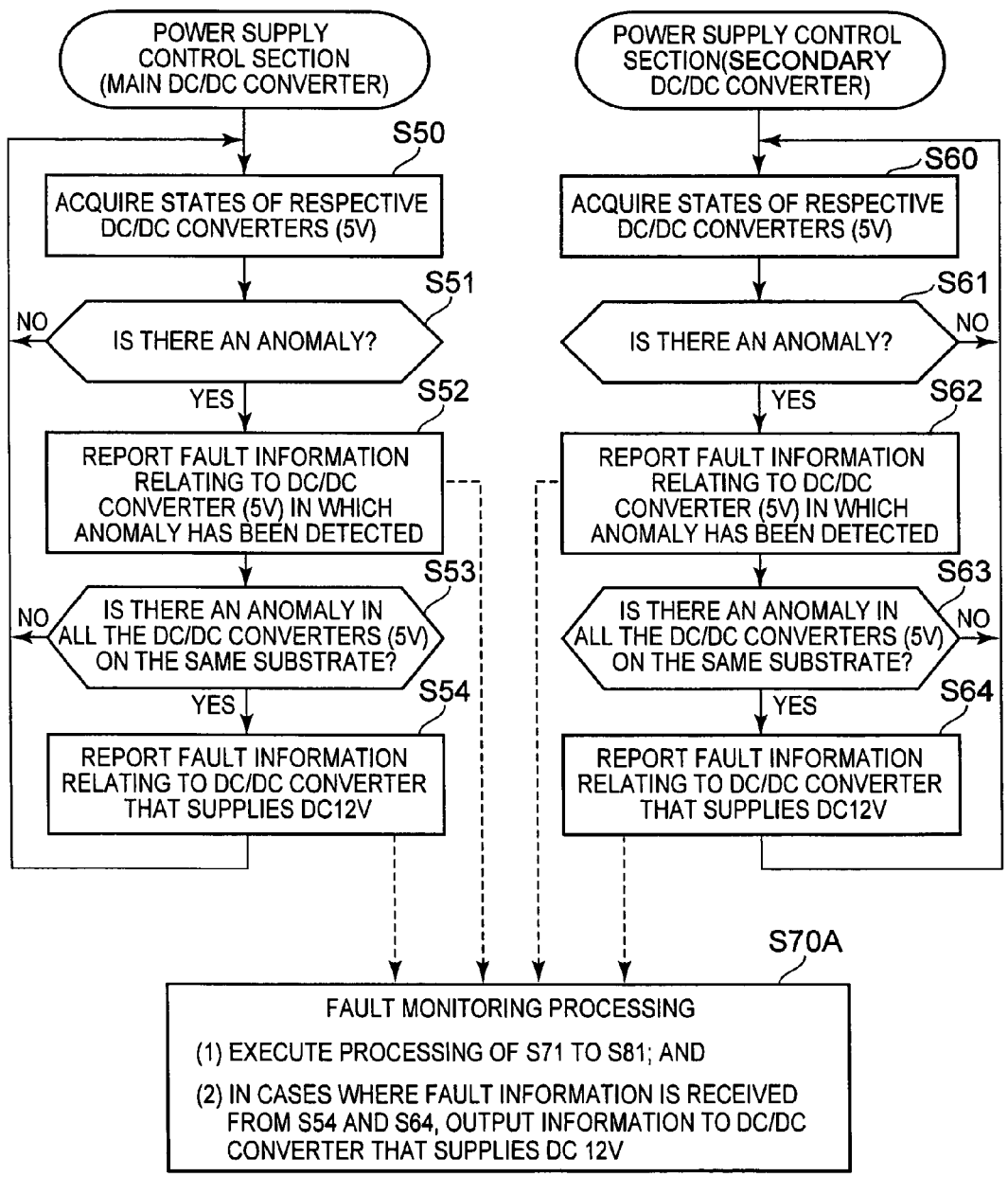
FIG. 21 is a flowchart showing processing whereby the power supply control section monitors the states of the respective DC/DC converters.

FIG. 21 is a flowchart showing monitoring processing for the DC/DC converters 311 that is performed by the power supply control section 330. This monitoring processing comprises all of S50 to S52 and S60 to S62 in the flowchart shown in FIG. 15. In addition, the monitoring processing of this embodiment has new steps S53, S54, S63, and S64. Hence, the description will focus on the new steps. Further, in order to distinguish the DC/DC converters 311 and DC/DC converter 312 in the flowchart, the DC/DC converters 311 are displayed as 'DC/DC converters (5V)'.

When a fault occurs in any of the DC/DC converters 311 (S51: YES, S61: YES), the power supply control section 330 reports fault information on the DC/DC converter 311 in which the fault has been detected to the fault monitoring section 340 (S52, S62).

Thereafter, the power supply control section 330 judges whether a fault has occurred in all the DC/DC converters 311 that exist on the same power supply substrate (S53, S63). When a fault has indeed occurred in all the DC/DC converters 311 on the same power supply substrate (S53: YES, S63: YES), the power supply control section 330 reports the fault information on the DC/DC converter 312 on the power supply substrate to the fault monitoring section 340 (S54, S64).

The fault monitoring section 340 executes the processing that appears in FIG. 16 (S71 to S81). Further, in cases where the fault monitoring section 340 receives fault information from S54 and S64, the fault monitoring section 340 issues a warning to the effect that a fault has occurred in the DC/DC converter 312 (S70A).

This embodiment, which is constituted in this way, affords the same results as those of the first embodiment. In addition, this embodiment makes it possible to reduce the power loss because the output of the DC/DC converter 312 that outputs DC 12V is used as the input of the DC/DC converters 311 that output DC 5V.

The first embodiment above is constituted such that DC power that is output by the AC/DC power supply section 40 is input to both the DC/DC converter 311 and the DC/DC converter 312. Hence, the value of the voltage that is output by the AC/DC power supply section 40 must be set higher than 12 volts. As a result, the DC/DC converter 311 of the first embodiment must lower voltages higher than 12 volts to 5 volts which involves a large power loss. In contrast, the DC/DC converter 311 of this embodiment need only lower the 12 volts output by the DC/DC converter 312 to 5 volts. Therefore, the loss can be made smaller than that of the first embodiment. Further, because the loss is reduced, the circuit of the DC/DC converter 311 can also be reduced at low cost.

Fourth Embodiment

The fourth embodiment will now be described with reference to FIGS. 22 and 23. In this embodiment, both the DC 5-volt supply path and the DC 12-volt supply path are connected as mentioned earlier in the first embodiment.

Figure 22:
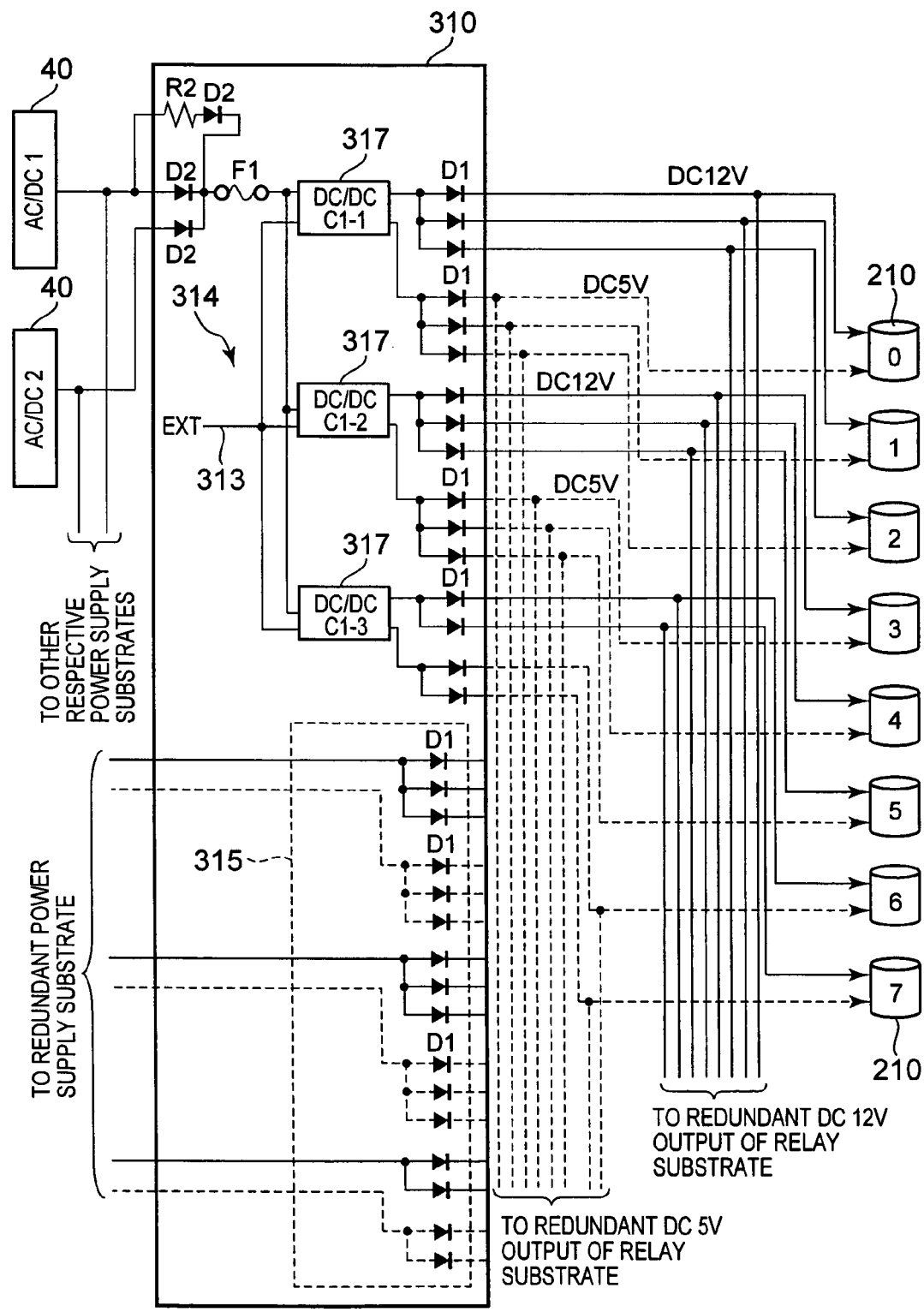
FIG. 22 is a circuit diagram showing an enlargement of the power supply substrate of a power supply device according to a fourth embodiment of the present invention.

FIG. 22 is a circuit diagram showing an enlargement of the normal power supply substrate 310 of this embodiment. The DC/DC converter 317 of this embodiment is constituted as a multiple-output DC/DC converter that is capable of outputting DC 12 volts and DC 5 volts. The respective DC/DC converters 317 output two or three of each of DC 12-volt and DC 5-volt outputs via the respective diodes D1.

The redundant power supply substrate 320 is also constituted comprising the multiple-output DC/DC converters 317 as per the respective normal power supply substrates 310. As described in the second embodiment, the redundant power supply substrate 320 of this embodiment bypasses the diode D1 in the redundant power supply substrate 320 so as to output DC 5V and DC 12V. In contrast, the constitution may also be such that DC 5V and DC 12V are output via the diode D1 in the redundant power supply substrate 320 as per the first embodiment.

Figure 23:
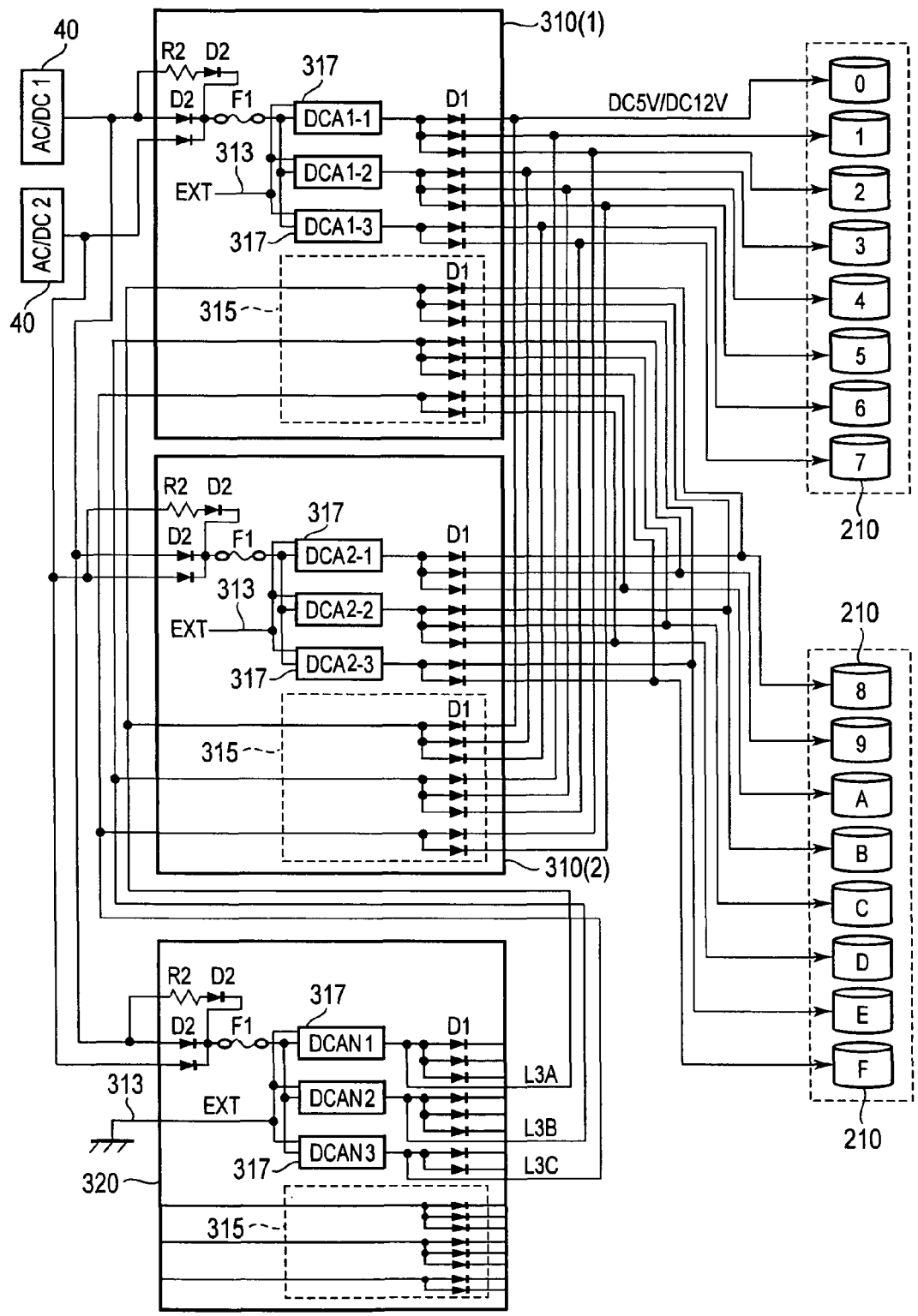
FIG. 23 is a circuit diagram showing a power supply structure.

FIG. 23 is a circuit diagram showing the structure of the supply of power of this embodiment. For the sake understanding, in FIG. 23, the DC 5V supply path and DC 12V supply path may be represented together as one path. In reality, as shown in FIG. 22, the DC 5V supply path and DC 12V supply path are independent.

As shown in FIG. 23, the respective DC/DC converters 317 in the normal power supply substrates 310 output DC 5V and DC 12V to the respective disk drives 210 in the corresponding drive groups DG. The respective DC/DC converters 317 in the redundant power supply substrate 320 are connected to the respective disk drives 210 via the relay circuit 315. As described in detail in the first embodiment, the respective DC/DC converters 317 in the redundant power supply substrate 320 are connected to disk drives 210 in the same position within each subgroup.

This embodiment, which is constituted in this way, also affords the same effects as those of the first embodiment. In addition, in this embodiment, because the multiple-output DC/DC converters 317 are used, the circuit constitution can be made simpler than that of the first embodiment. Further, in this embodiment, because the DC 12V supply path is made redundant as per the redundant constitution of the DC 5V supply path, the reliability of the power supply device 300 can be improved further.

The present invention is not limited to the embodiments described hereinabove. A person skilled in the art is able to carry out a variety of additions and modifications within the scope of the present invention. The respective embodiments can, for example, be suitably combined.

What is claimed is:

1. A power supply device that supplies power to a load, comprising:
    a plurality of first power supply units which as provided in correspondence with a plurality of load groups each constituted comprising a plurality of loads and which each supply power via a first path to the respective loads in the corresponding load groups;
    a second power supply unit that is provided in correspondence with all of the load groups and which supplies power via a second path to the respective loads in the respective load groups; and
    a power supply control section that controls the first power supply units and the second power supply unit, respectively,
    wherein the respective first power supply units each comprise first power supply output sections of the same number as that of a plurality of subgroups that are provided in the respective load groups;
    the second power supply unit comprises second power supply output sections of the same number as that of the subgroups;
    the respective first power supply output sections correspond with the respective subgroups in the corresponding load groups and supply power via the first path to each of the loads in the corresponding subgroups; and
    the respective second power supply output sections correspond with all of the respective subgroups in the respective load groups and supply power via the second path to any one predetermined load among the respective loads in the subgroups for each of the subgroups.

2. The power supply device according to claim 1, wherein the respective first power supply units are each provided with a relay section for outputting power that is input from the second power supply unit to the other first power supply units; and
    one end of the second path is connected midway along the predetermined first path which is connected to the predetermined load and the other end of the second path is connected to the second power supply unit via the relay section of the first power supply unit other than the first power supply unit to which the predetermined first path is connected.

3. The power supply device according to claim 1, wherein the respective first power supply units are each provided with a relay section for outputting power that is input from the second power supply unit;
    one pair is constituted by two of the first power supply units;
    the relay section in the first of the first power supply units constituting the pair is connected to the first path that is connected to the second of the first power supply units constituting the pair; and
    the relay section in the second of the first power supply units is connected to the first path that is connected to the first of the first power supply units.

4. The power supply device according to claim 1, wherein the respective second power supply output sections are each set to output power of a lower voltage value than a voltage value of the power supply that is output from each of the first power supply output sections.

5. The power supply device according to claim 1, wherein the first and second paths are each provided with backflow prevention elements that allow an electric current to flow toward the load but prevent an electric current from flowing in the reverse direction; and
    the power supply device is configured so that the number of the backflow prevention elements on the second path is larger than the number of the backflow prevention elements on the first path.

6. The power supply device according to claim 1, wherein the respective first power supply units and the second power supply unit each comprise a voltage conversion section for reducing the voltage value of the input power supply and outputting the reduced voltage value;
    in the respective first power supply units, the respective first power supply output sections convert the power supply that is input from the voltage conversion section in the first power supply unit into a power supply of a first predetermined voltage and outputs the converted power supply to the first path; and
    in the second power supply unit, the respective second power supply output sections convert the power supply that is input from the voltage conversion section in the second power supply unit into a power supply of a second predetermined voltage that is lower than the first predetermined voltage and outputs the converted power supply to the second path.

7. The power supply device according to claim 1, wherein the power supply control section individually controls the supply of power and stoppage of the power supply for each of the loads by controlling a power supply operation of a predetermined first power supply output section and a predetermined second power supply output section which are connected to a predetermined load respectively, among the respective first power supply output sections and the respective second power supply output sections.

8. The power supply device according to claim 7, wherein the power supply control section stops the supply of power to the predetermined load by stopping the power supply of the predetermined first power supply output section and the predetermined second power supply output section, and reports the fact that the supply of power to the predetermined load has stopped; and the power supply control section supplies power to the predetermined load by starting the power supply of the predetermined first power supply output section and the predetermined second power supply output section, and reports the fact that the power supply to the predetermined load has started.

9. The power supply device according to claim 7, wherein the power supply control section causes the respective power supply output sections to operate after starting the supply of power from the first power supply output section to the respective loads.

10. The power supply device according to claim 1, wherein the power supply control section:

(1) acquires the states of the respective first power supply output sections and the respective second power supply output sections;

(2) in cases where a fault is detected in only either the respective first power supply output sections or the respective second power supply output sections, outputs a warning with respect to the power supply output section in which the fault has been detected;

(3) in cases where a fault is detected in the first power supply output section and the second power supply output section that supply power to the same load, among the respective first power supply output sections and the respective second power supply output sections, acquires the state of the load connected to the first power supply output section and the second power supply output section in which the fault has been detected, and judges whether a fault has occurred in the load on the basis of the acquired state;

(4) in cases where it is judged that a fault has occurred in the load, outputs a warning with respect to the load; and (5) in cases where it is judged that a fault has not occurred in the load, outputs a warning with respect to the first power supply output section and the second power supply output section in each of which the fault has been detected.

11. The power supply device according to claim 1, wherein the load is a storage device that is used in the storage control device.

12. A storage control device that provides a higher-level device with a storage region, comprising:

a plurality of storage devices that consume electric power;

a controller that controls the operation of the respective storage devices;

a power supply device that supplies power to the respective storage devices;

a plurality of device groups each constituted comprising a plurality of the storage devices; and a plurality of subgroups which are provided in the respective device groups and which are each constituted comprising a plurality of the storage devices, wherein the power supply device comprises:

a plurality of first power supply units provided in correspondence with the respective device groups and which each supply power via a first path to the respective storage devices in the corresponding device groups;

a second power supply unit that is provided in correspondence with all of the device groups and which supplies power via a second path to the respective storage devices in the respective device groups; and a power supply control section that controls the first power supply units and the second power supply unit, respectively, wherein the respective first power supply units each comprise first power supply output sections of the same number as that of the subgroups;

the second power supply unit comprises second power supply output sections of the same number as that of the subgroups;

the respective first power supply output sections correspond with the respective subgroups in the corresponding device groups and supply power via the first path to each of the storage devices in the corresponding subgroups; and the respective second power supply output sections correspond with all of the respective subgroups in the respective device groups and supply power via the second path to any one predetermined storage device among the respective storage devices in the subgroups for each of the subgroups.

* * * * *